(12) United States Patent
Aiso

(10) Patent No.: US 7,702,184 B2
(45) Date of Patent: Apr. 20, 2010

(54) GENERATION OF HIGH-RESOLUTION IMAGE BASED ON MULTIPLE LOW-RESOLUTION IMAGES

(75) Inventor: Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1493 days.

(21) Appl. No.: 10/954,028

(22) Filed: Sep. 28, 2004

(65) Prior Publication Data

US 2005/0163402 A1 Jul. 28, 2005

(30) Foreign Application Priority Data

Sep. 30, 2003 (JP) .............................. 2003-339907
Jul. 15, 2004 (JP) .............................. 2004-208580

(51) Int. Cl.
G06K 9/32 (2006.01)
(52) U.S. Cl. ........................ 382/299; 382/294; 382/293; 382/298
(58) Field of Classification Search ................. 382/284, 382/298–300, 103; 348/143–159
See application file for complete search history.

(56) References Cited

U.S. PATENT DOCUMENTS 5,917,554 A 6/1999 Ohta (Continued)

FOREIGN PATENT DOCUMENTS

JP 2000-244851 9/2000

OTHER PUBLICATIONS

Schultz et al., "Subpixel motion estimation for super-resolution image sequence enhancement," Journal of Visual Communication and Image Representation, vol. 9 No. 1 Mar. 1998.*

(Continued)

*Primary Examiner*—Bhavesh M Mehta
*Assistant Examiner*—Sean Motsinger
(74) *Attorney, Agent, or Firm*—Martine Penilla & Gencarella, LLP

(57) ABSTRACT

The procedure of the present invention estimates a correction rate for elimination of a positional shift between the multiple first images, executes correction with the estimated correction rate to eliminate the positional shift between the multiple first images, and combines the multiple corrected first images to generate the second image. The procedure selects a target pixel among pixels included in the second image, and detects multiple adjacent pixels respectively in the multiple first images, which adjoin to the selected target pixel. The procedure then selects an image as a composition object or a composition object image with regard to the target pixel among the multiple first images according to the multiple adjacent pixels, and calculates a pixel value of the target pixel based on the composition object image. The procedure excludes the first image that includes a certain adjacent pixel out of the multiple adjacent pixels, which is detected to have a motion relative to one base image selected among the multiple first images, from the composition object image with regard to the target pixel. This arrangement of the invention enables generation of a high-resolution still image by taking into account motions of image parts.

8 Claims, 16 Drawing Sheets

U.S. PATENT DOCUMENTS

| | | | |
|---|---|---|---|
| 6,122,017 | A | 9/2000 | Taubman |
| 6,385,250 | B1 | 5/2002 | Kondo et al. |
| 6,711,278 | B1 * | 3/2004 | Gu et al. .................. 382/103 |
| 7,248,751 | B2 * | 7/2007 | Schuler et al. ............. 382/284 |
| 7,260,260 | B2 * | 8/2007 | Kondo et al. .............. 382/173 |
| 2001/0046331 | A1 * | 11/2001 | Altunbasak et al. ........ 382/299 |
| 2004/0135886 | A1 * | 7/2004 | Baker et al. ............... 348/143 |
| 2006/0291751 | A1 * | 12/2006 | Milanfar et al. ............ 382/299 |
| 2007/0071362 | A1 * | 3/2007 | Milanfar et al. ............ 382/299 |

OTHER PUBLICATIONS

Abstract of Japanese Patent Publication 2000-244851, Pub. Date: Sep. 8, 2000, Patent Abstracts of Japan.

* cited by examiner

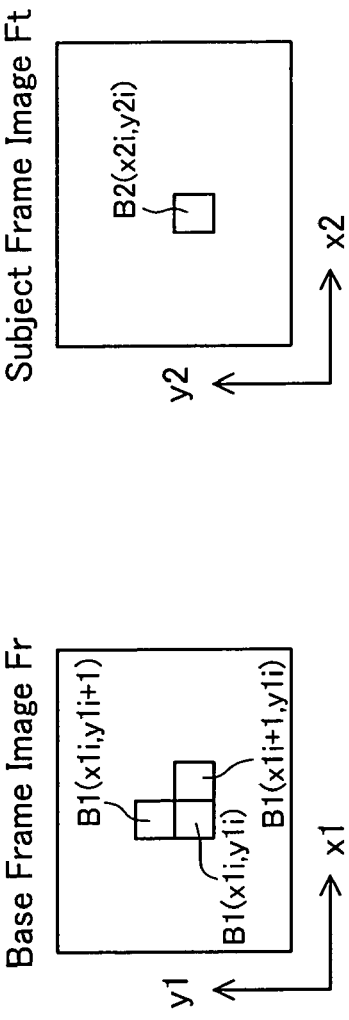
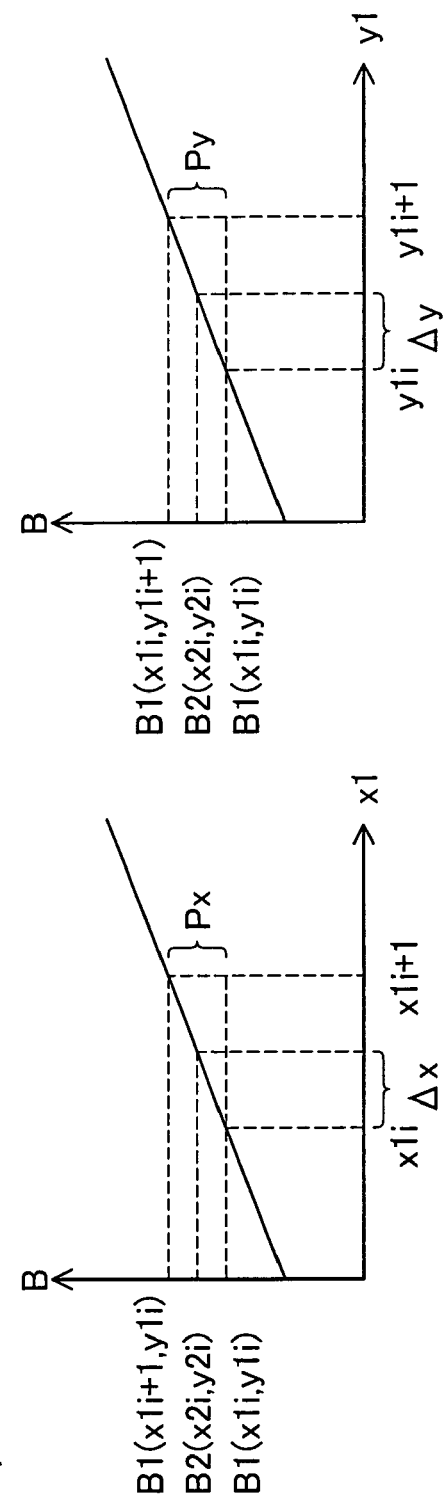
Fig.6(A)
Fig.6(B)

● Pixels of Resulting Image G

◇ Pixels in Base Frame Image F0   ◈ Pixels in Subject Frame Image F1

◈ Pixels in Subject Frame Image F2   ◈ Pixels in Subject Frame Image F3

◇ Pixels in Base Frame Image Fr
◆ Pixel in Subject Frame Image Ft $Vth_U(\Delta x) = V'(\Delta x) + \Delta Vthmax \cdot W(\Delta x) + \Delta Vth$
$Vth_L(\Delta x) = V'(\Delta x) - \Delta Vthmax \cdot W(\Delta x) - \Delta Vth$ $W(\Delta x) = 2 \times [1 - \{(1-\Delta x)^2 + \Delta x^2\}]$
$= 4(1-\Delta x)\Delta x$ $\Delta Vthmax = (Vmax - Vmin) / 2$

US 7,702,184 B2

GENERATION OF HIGH-RESOLUTION IMAGE BASED ON MULTIPLE LOW-RESOLUTION IMAGES

BACKGROUND OF THE INVENTION

1. Field of the Invention

The present invention relates to a technique of generating a high-resolution image from multiple low-resolution images.

2. Description of the Related Art

The user of a digital video camera (hereafter may simply be referred to as 'video camera') often demands to capture one scene or frame during reproduction of a moving picture and generate a higher-resolution image than the resolution of the image of the captured frame (hereafter referred to as the 'frame image'). Here the terminology 'resolution' means the density of pixels or the number of pixels included in one image.

One typical method of generating the higher-resolution image combines multiple low-resolution images. Combination of multiple low-resolution images is expected to enhance the quality of a resulting composite image, compared with simple resolution conversion of only one image.

For example, a proposed technique in Japanese Patent Laid-Open Gazette No. 2000-244851 selects one frame image as a base frame image among (n+1) consecutive frame images, computes motion vectors of the residual n frame images (subject frame images) relative to the base frame image, and combines the (n+1) frame images based on the computed motion vectors to generate one high-resolution image.

Images of multiple frames included in the moving picture may have a 'positional shift' or a 'motion'. Here the 'positional shift' represents a positional change between multiple frames that is eliminated by uniformly moving the whole image, for example, an image shift due to an unintentional hand movement. The 'motion' mainly represents movement of a certain subject in the image, that is, a local change in the image. The motion includes both a direct movement of a subject, such as a person or an automobile, and a relative movement of the subject due to a parallax caused by a moving camera.

The prior art technique gives consideration to the motion between the multiple frames in the moving picture (corresponding to the 'positional shift') but does not take into account the motion in the moving picture. A resulting composite image may accordingly have an undesirable image overlap of an identical image part with motions. There is accordingly a demand to generate a high-resolution still image from multiple low-resolution frame images included in a moving picture without causing any image overlap of an identical image part with motions.

This problem is not intrinsic to composition of multiple low-resolution images included in a moving picture but is generally found in composition of multiple low-resolution images arrayed in a time series.

SUMMARY OF THE INVENTION

The object of the invention is thus to eliminate the drawbacks of the prior art technique and to provide a technique of generating a high-resolution still image from multiple low-resolution images without causing any image overlap of an identical image part with motions.

In order to attain at least part of the above and the other related objects, the invention executes a series of processing to generate a relatively high-resolution second image from multiple relatively low-resolution first images. The processing flow estimates a correction rate for elimination of a positional shift between the multiple first images, executes correction with the estimated correction rate to eliminate the positional shift between the multiple first images, and combines the multiple corrected first images to generate the second image. The invention executes a series of processing to generate the second image. The processing flow selects a target pixel among pixels included in the second image, and detects multiple adjacent pixels respectively in the multiple first images, which adjoin to the selected target pixel. The processing flow then selects an image as a composition object or a composition object image with regard to the target pixel among the multiple first images according to the multiple adjacent pixels, and calculates a pixel value of the target pixel based on the composition object image. The processing flow excludes the first image that includes a certain adjacent pixel out of the multiple adjacent pixels, which is detected to have a motion relative to one base image selected among the multiple first images, from the composition object image with regard to the target pixel.

The technique of the invention excludes the first image including the pixel with motion from the composition object for generation of the second image from the multiple first images. This arrangement ensures generation of the relatively high-resolution second image from the multiple relatively low-resolution first images without causing any image overlap of an identical image part with motions.

It is preferable that the multiple first images are multiple images extracted from a moving picture and arrayed in a time series.

The relatively high-resolution second image is thus readily generated from the multiple relatively low-resolution first images included in the moving picture.

The first images may be frame images or field images. The frame image represents a still image expressible in a progressive system (that is, in a non-interlacing system). The field images include still images of odd fields and even fields to constitute an image in an interlacing system, which corresponds to the frame image in the non-interlacing system.

A first available procedure calculates pixel values of the respective pixels in the following manner to generate the second image. The first procedure sequentially selects an adjacent pixel that is not included in the base image among the multiple adjacent pixels in an order closer to the target pixel and detects motion or no motion of the selected pixel relative to the base image. When the first image including a nearest pixel having a shortest distance to the target pixel among the multiple adjacent pixels is the base image, the procedure calculates the pixel value of the target pixel based on the base image. The procedure calculates the pixel value of the target pixel based on the first image including the selected pixel detected as a pixel with no motion by the motion detection, while calculating the pixel value of the target pixel based on the base image when every selected adjacent pixel is detected as a pixel with motion by the motion detection.

The first available procedure of generating the second image sequentially selects the adjacent pixel that is not included in the base image among the multiple adjacent pixels in the order closer to the target pixel and detects motion or no motion of the selected pixel relative to the base image. The procedure calculates the pixel value of the target pixel based on the first image including one adjacent pixel detected as the pixel with no motion, even when another adjacent pixel is detected as the pixel with motion. This arrangement is thus expected to enhance the quality of the resulting second image.

A second available procedure calculates pixel values of the respective pixels in the following manner to generate the second image. The second procedure sequentially selects an adjacent pixel that is not included in the base image among the multiple adjacent pixels in a preset order and detects motion or no motion of the selected pixel relative to the base image. The procedure calculates the pixel value of the target pixel based on the base image when the selected pixel is detected as a pixel with motion by the motion detection, while calculating the pixel value of the target pixel based on the first image including a nearest pixel to the target pixel among the multiple adjacent pixels when every selected adjacent pixel is detected as a pixel with no motion by the motion detection.

The second available procedure of generating the second image sequentially selects the adjacent pixel that is not included in the base image among the multiple adjacent pixels in the preset order and detects motion or no motion of the selected pixel relative to the base image. The procedure calculates the pixel value of the target pixel based on the base image, in the case of detection of the selected pixel as the pixel with motion. This arrangement thus more effectively prevents the occurrence of an image overlap of an identical image part with motions, compared with the first procedure discussed above.

A third available procedure calculates pixel values of the respective pixels in the following manner to generate the second image. The third procedure sequentially selects an adjacent pixel that is included in a specific first image other than the base image, among the multiple adjacent pixels and detects motion or no motion of the selected pixel relative to the base image. The procedure calculates the pixel value of the target pixel based on the base image when the selected pixel is detected as a pixel with motion by the motion detection, while calculating the pixel value of the target pixel based on the first image including a nearest pixel to the target pixel among the multiple adjacent pixels when the selected pixel is detected as a pixel with no motion by the motion detection.

The third available procedure of generating the second image sequentially selects the adjacent pixel that is not included in the base image among the multiple adjacent pixels and detects motion or no motion of the selected pixel relative to the base image. The procedure calculates the pixel value of the target pixel based on the base image, in the case of detection of the selected pixel as the pixel with motion. This arrangement thus more effectively prevents the occurrence of an image overlap of an identical image part with motions, compared with the first procedure discussed above. The third procedure selects the adjacent pixel that is included in the specific first image other than the base image among the multiple adjacent pixels. This arrangement desirably shortens the total processing time required for the motion detection, compared with the first procedure and the second procedure discussed above.

One preferable method of the motion detection detects the selected pixel as the pixel with no motion when a luminance value of the selected pixel is within a predetermined range relative to an estimated luminance value, which is calculated from luminance values of multiple nearby pixels in the base image surrounding the selected pixel, while detecting the selected pixel as the pixel with motion when the luminance value of the selected pixel is out of the predetermined range. This method ensures the easy motion detection.

The predetermined range may have a fixed span set about the estimated luminance value. The predetermined range may vary corresponding to a time difference of the first image including the selected pixel relative to the base image. Namely the no motion detection range, where the selected pixel is detected as the pixel with no motion, is varied corresponding to the time difference of the first image including the selected pixel relative to the base image. An image having a greater time difference from the base image is generally expected to have a more significant level of motion. Narrowing the predetermined range set for the motion detection of the pixel included in the first image having the greater time difference from the base image reduces the effect of the motion to a greater extent on the resulting second image.

The predetermined range may alternatively have a fixed span between a minimum luminance value and a maximum luminance value out of the luminance values of the multiple nearby pixels in the base image surrounding the selected pixel.

The predetermined range may otherwise vary depending upon a position of the selected pixel relative to the multiple nearby pixels in the base image surrounding the selected pixel.

Another preferable method of the motion detection computes an estimated position of a pixel having a luminance value that is calculated from luminance values of multiple nearby pixels in the base image surrounding the selected pixel and is identical with a luminance value of the selected pixel, and detects the selected pixel as the pixel with no motion when a distance between a position of the selected pixel and the estimated position is within a predetermined range, while detecting the selected pixel as the pixel with motion when the distance between the position of the selected pixel and the estimated position is out of the predetermined range. This method also ensures the easy motion detection.

The predetermined range may have a fixed span about the estimated position with setting of a variation in estimated position, which varies corresponding to the positional shift, as a threshold value.

The technique of the invention is actualized by any of the diverse applications given below:
  (1) image generation methods, image processing methods, and image data generation methods;
  (2) image generation apparatuses, image processing apparatuses, and image data generation apparatuses;
  (3) computer programs that attain any of the above apparatuses and methods;
  (4) recording media in which such computer programs for attaining any of the above apparatuses and methods are recorded; and
  (5) data signals that include such computer programs for attaining any of the above apparatuses and methods and are embodied in carrier waves.

In the applications of the computer programs and the recording media in which the computer programs are recorded, each computer program may be constructed as a whole program of controlling the operations of the still image generation apparatus or as a partial program of exerting only the essential functions of the invention. Typical examples of the recording media include flexible disks, CD-ROMs, DVD-ROMs and DVD-RAMs, magneto-optical disks, IC cards, ROM cartridges, punched cards, prints with barcodes or other codes printed thereon, internal storage devices (memories, such as RAMs and ROMs) and external storage devices of the computer, and diversity of other computer readable media.

BRIEF DESCRIPTION OF THE DRAWINGS

FIGS. 6(A) and 6(B) are explanatory drawings showing estimation of translational correction rates by the gradient method;

DESCRIPTION OF THE PREFERRED EMBODIMENTS

Some modes of carrying out the invention are described below as preferred embodiments in the following sequence:

A. Configuration of Still Image Generation Apparatus

B. Procedure of Still Image Generation

C. Correction Rate Estimation Process
   C1. Outline of Positional Shift Correction
   C2. Method of Estimating Correction Rates D. Motion Follow-Up Composition Process of First Embodiment
   D1. Outline and Potential Problem of Motion Non-Follow-Up Composition
   D2. Procedure of Motion Follow-Up Composition E. Motion Detection
   E1. Motion Detection Method 1
   E2. Motion Detection Method 2
   E3. Motion Detection Method 3
   E4. Motion Detection Method 4
   E5. Motion Detection Method 5

F. Motion Follow-Up Composition Process of Second Embodiment

G. Motion Follow-Up Composition Process of Third Embodiment

H. Modifications

A. Configuration of Still Image Generation Apparatus

Figure 1:
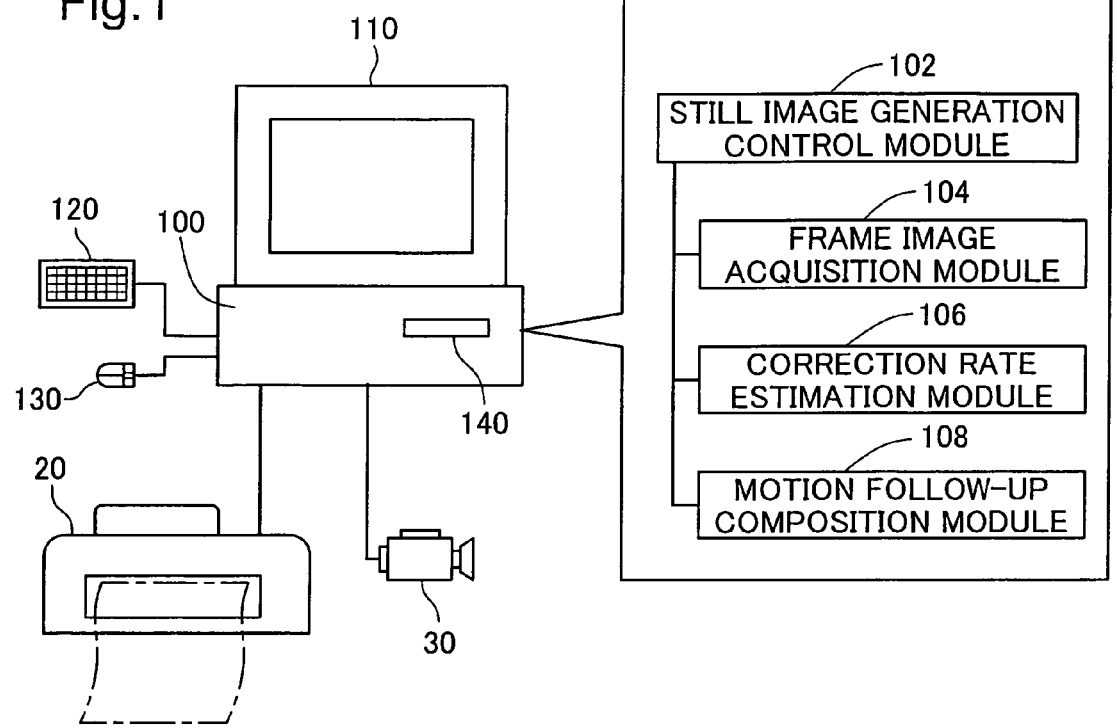
FIG. 1 schematically illustrates the configuration of a still image generation apparatus in one embodiment of the invention.

FIG. 1 schematically illustrates the configuration of a still image generation apparatus in one embodiment of the invention. The still image generation apparatus is constructed by a general-purpose personal computer 100 and is connected with a keyboard 120 and a mouse 130 as information input devices and a display 110 and a printer 20 as information output devices. The still image generation apparatus is also connected with a digital video camera 30 and a CD-R/RW drive 140 to input image data representing moving pictures (hereafter referred to as 'moving picture data') to the computer 100. The device of inputting the moving picture data is not restricted to the CD-R/RW drive but may be a DVD drive and any other drive units of reading data from diversity of information storage media.

The computer 100 executes an application program of generating still images under a preset operating system to function as the still image generation apparatus. As illustrated, the computer 100 exerts the functions of a still image generation control module 102, a frame image acquisition module 104, a correction rate estimation module 106, and a motion follow-up composition module 108.

The still image generation control module 102 controls the respective devices to generally regulate the still image generation operations. For example, in response to the user's entry of a video reproduction command from the keyboard 120 or the mouse 130, the still image generation control module 102 reads moving picture data from a CD-RW set in the CD-R/RW drive 140, the digital video camera 30, or a hard disk (not shown) into an internal memory (not shown). The moving picture data includes image data of multiple frames respectively representing still images (hereafter referred to as 'frame image data'). The still images expressed by the frame image data of respective frames are successively shown on the display 110 via a video driver, so that a moving picture is reproduced on the display 110. The still image generation control module 102 controls the operations of the frame image acquisition module 104, the correction rate estimation module 106, and the motion follow-up composition module 108 to generate high-resolution image data representing a still image (hereafter referred to as 'still image data') from low-resolution frame image data of multiple frames, as described below. The still image generation control module 102 also controls the printer 20 via a printer driver to print the generated still image data.

B. Still Image Generation Process

Figure 2:
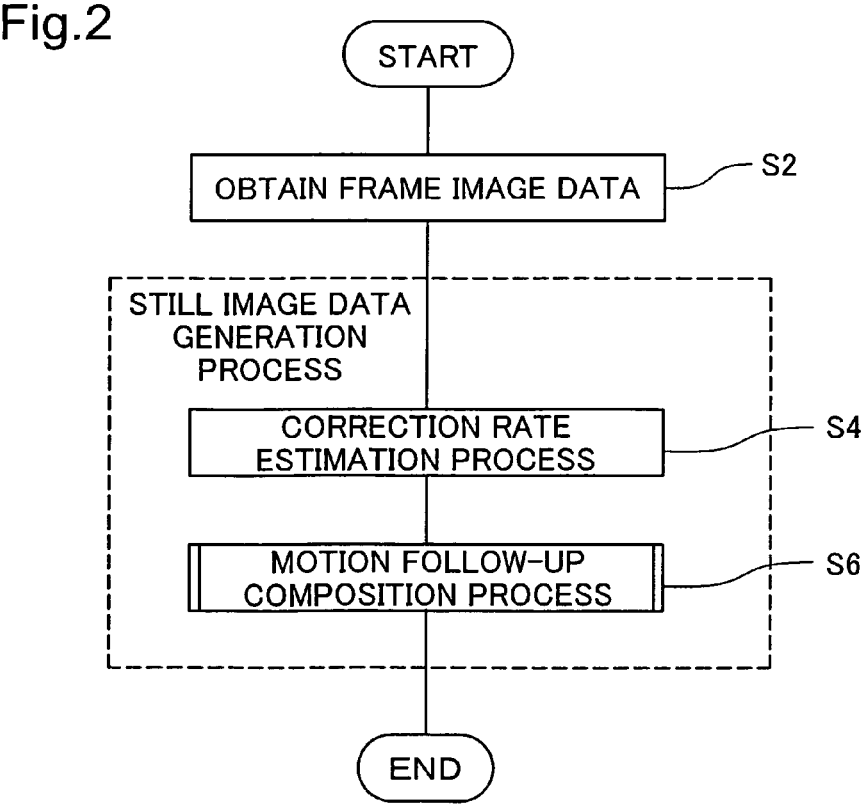
FIG. 2 is an explanatory drawing showing a still image data generation process.

FIG. 2 is an explanatory drawing showing a still image data generation process. In response to the user's entry of a frame image data acquisition command from the keyboard 120 or the mouse 130 during reproduction of a moving picture, the frame image acquisition module 104 obtains frame image data of multiple consecutive frames in a time series among the moving picture data (step S2). For example, the procedure of this embodiment obtains frame image data of four consecutive frames in a time series after the input timing of the frame image data acquisition command. The multiple frame image data obtained by the frame image acquisition module 104 are stored in a storage device (not shown), such as the memory or the hard disk.

The frame image data consists of tone data (pixel data) representing tone values (pixel values) of respective pixels in a dot matrix. The pixel data may be YCbCr data of Y (luminance), Cb (blue color difference), and Cr (red color difference) components or RGB data of R (red), G (green), and B (blue) color components.

In response to the user's entry of a still image generation command from the keyboard 120 or the mouse 130, the procedure starts a still image data generation process.

The correction rate estimation module 106 estimates correction rates to eliminate positional shifts between the obtained four consecutive frames (step S4). The correction rate estimation process specifies one frame among the four consecutive frames as a base frame and the other three frames as subject frames and estimates correction rates to eliminate positional shifts of the respective subject frames relative to the base frame. The procedure of this embodiment specifies an initial frame obtained first in response to the user's entry of the frame image data acquisition command as the base frame and the three consecutive frames obtained successively in the time series as the subject frames.

The motion follow-up composition module 108 corrects the frame image data of the four consecutive frames with the estimated correction rates and combines the corrected frame image data of the four consecutive frames to generate still image data (step S6). The motion follow-up composition module 108 detects 'motions' or 'no motions' between the respective frames and generates still image data according to the results of the motion detection.

The details of the correction rate estimation process and the details of the motion follow-up composition process are described below.

C. Correction Rate Estimation Process

C1. Outline of Positional Shift Correction

Figure 3:
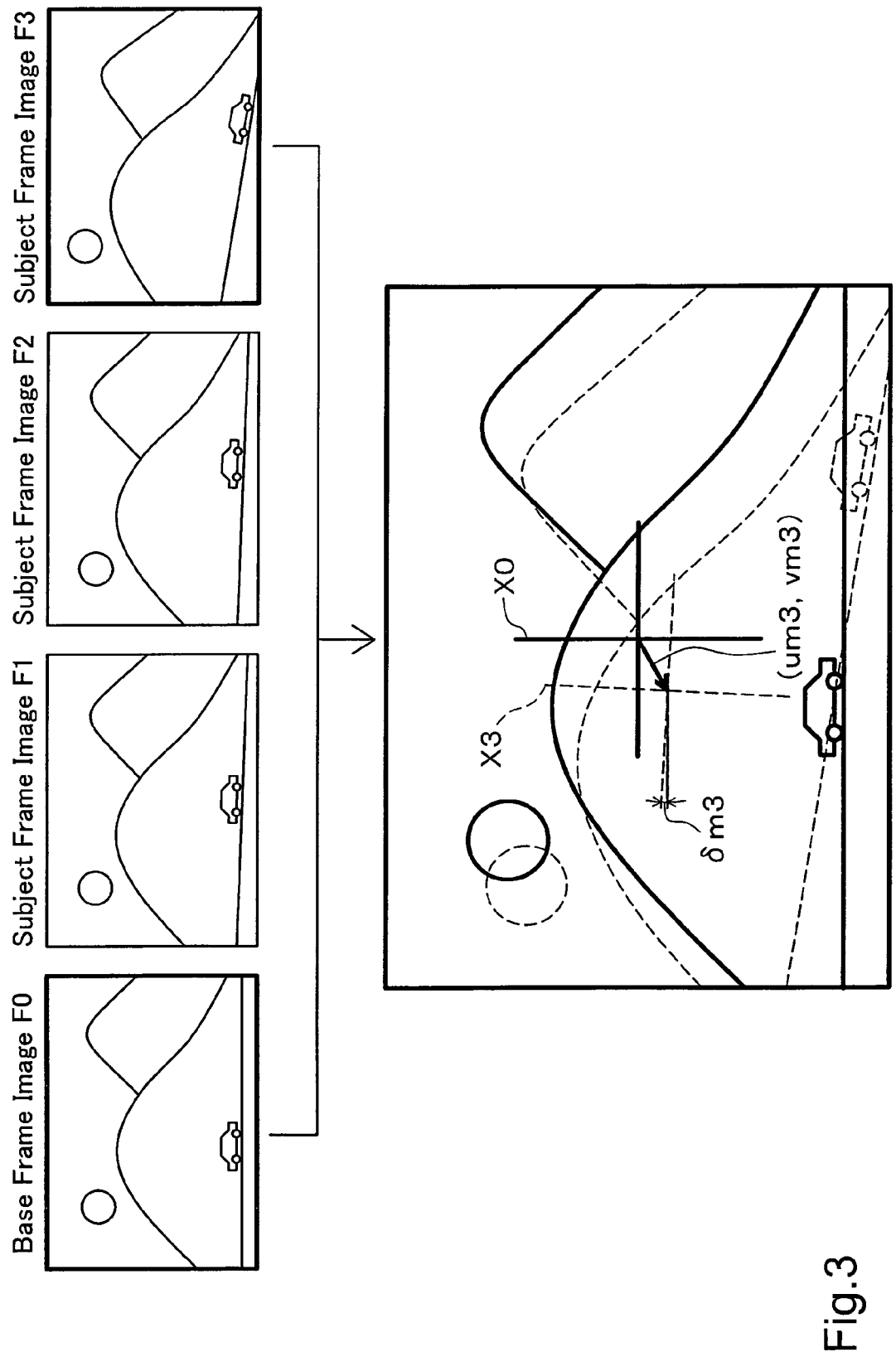
FIG. 3 is an explanatory drawing showing a positional shift of a subject frame image in a subject frame relative to a base frame image in a base frame.
Figure 4:
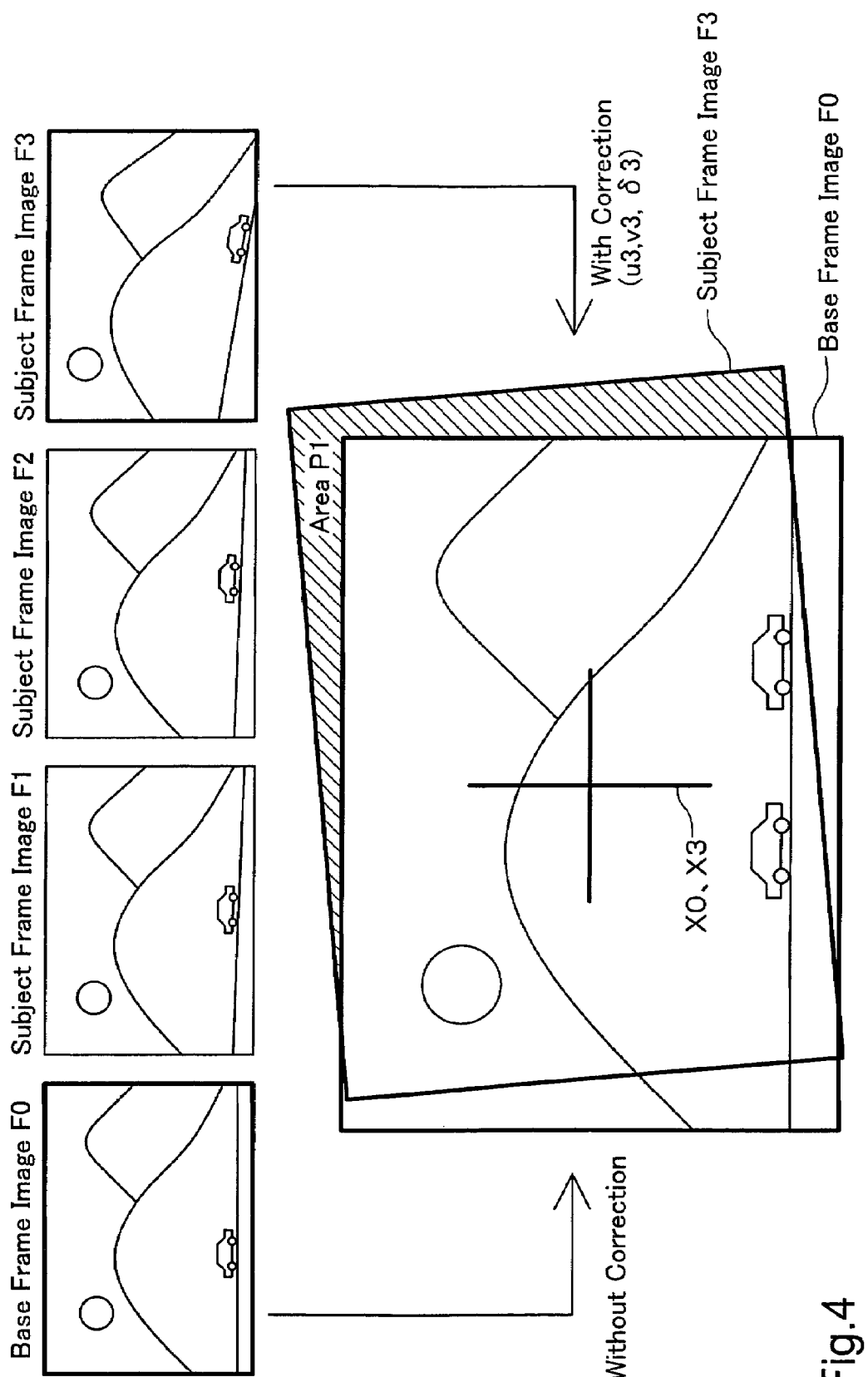
FIG. 4 is an explanatory drawing showing correction executed to eliminate the positional shift of the subject frame image relative to the base frame image.

FIG. 3 is an explanatory drawing showing a positional shift of a subject frame image in a subject frame relative to a base frame image in a base frame. FIG. 4 is an explanatory drawing showing correction executed to eliminate the positional shift of the subject frame image relative to the base frame image.

In the description below, a number (frame number) 'a' (a=0, 1, 2, 3) is allocated to each of the obtained four consecutive frames. A frame 'a' represents a frame with the frame number 'a' allocated thereto. An image in the frame 'a' is called a frame image Fa. For example, the frame with the frame number 'a'=0 is a frame 0 and the image in the frame 0 is a frame image F0. The frame 0 is the base frame and frames 1 to 3 are the subject frames. The frame image F0 in the base frame is the base frame image, while frame images F1 to F3 in the subject frames are the subject frame images.

FIGS. 3 and 4 respectively show a positional shift of the subject frame image F3 among the subject frame images F1 to F3 relative to the base frame image F0 and correction executed to eliminate the positional shift.

A positional shift of the image is expressed by a combination of translational (lateral and vertical) shifts and a rotational shift. For the clear and better understanding of a positional shift of the subject frame image F3 relative to the base frame image F0, the boundary of the subject frame image F3 is superposed on the boundary of the base frame image F0 in FIG. 3. A virtual cross image X0 is added on the center position of the base frame image F0. On the assumption that the cross image X0 is shifted in the same manner as the subject frame image F3, a shifted cross image X3 is added on the subject frame image F3. For the clarity of illustration, the base frame image F0 and the virtual cross image X0 are shown by thick solid lines, whereas the subject frame image F3 and the shifted cross image X3 are shown by the thin broken lines.

In this embodiment, translational shifts in the lateral direction and in the vertical direction are respectively represented by 'um' and 'vm', and a rotational shift is represented by '$\delta$m'. The positional shifts of the subject frame images Fa (a=1, 2, 3) are accordingly expressed as 'uma', 'vma', and '$\delta$ma'. In the illustrated example of FIG. 3, the subject frame image F3 has translational shifts and a rotational shift relative to the base frame image F0, which are expressed as 'um3', 'vm3', and '$\delta$m3'.

Prior to composition of the subject frame images F1 to F3 with the base frame image F0, correction of positional differences of respective pixels included in the subject frame images F1 to F3 is required to eliminate the positional shifts of the subject frame images F1 to F3 relative to the base frame image F0. Translational correction rates in the lateral direction and in the vertical direction are respectively represented by 'u' and 'v', and a rotational correction rate is represented by '$\delta$'. The correction rates of the subject frame images Fa (a=1, 2, 3) are accordingly expressed as 'ua', 'va', and '$\delta$a'. For example, correction rates of the subject frame image F3 are expressed as 'u3', 'v3', and '$\delta$3'.

The terminology 'correction' here means that the position of each pixel included in each subject frame image Fa (a=1, 2, 3) is moved by a distance 'ua' in the lateral direction, a distance 'va' in the vertical direction, and a rotation angle '$\delta$a'. The correction rates 'ua', 'va', and '$\delta$a' of the subject frame image Fa (a=1, 2, 3) are thus expressed by equations 'ua=−uma', 'va=−vma', and '$\delta$a=−$\delta$ma'. For example, the correction rates 'u3', 'v3', and '$\delta$3' of the subject frame image F3 are expressed by equations 'u3=−um3', 'v3=−vm3', and '$\delta$3=−$\delta$m3'.

The correction process of FIG. 4 corrects the position of each pixel included in the subject frame image F3 with the correction rates 'u3', 'v3', and '$\delta$3' to eliminate the positional shift of the subject frame image F3 relative to the base frame image F0. FIG. 4 shows superposition of the corrected subject frame image F3 over the base frame image F0 on the display 110. The corrected subject frame image F3 partly matches with the base frame image F0. For the better understanding of the result of the correction, the virtual cross images X0 and X3 used in FIG. 3 are also added on the display of FIG. 4. The correction results in eliminating the positional difference between the two virtual cross images X0 and X3 and perfectly matching the positions of the two virtual cross images X0 and X3 with each other as clearly seen in FIG. 4.

In a similar manner, the correction process corrects the other subject frame images F1 and F2 with the correction rates 'u1', 'v1', and '$\delta$1' and 'u2', 'v2', and '$\delta$2' to move the positions of the respective pixels included in the subject frame images F1 and F2.

The expression 'partly match' is used here because of the following reason. In the illustrated example of FIG. 4, a hatched image area P1 is present only in the subject frame image F3, and the base frame image F0 does not have a corresponding image area. The positional shift causes an image area that is present only in the base frame image F0 or that is present only in the subject frame image F3. The correction can thus not perfectly match the subject frame image F3 with the base frame image F0 but gives only a partial matching effect.

The correction rate estimation module 106 (see FIG. 1) computes the correction rates 'ua', 'va', and 'δa' of the respective subject frame images Fa (a=1, 2, 3) as estimated values from the image data of the base frame image F0 and the image data of the subject frame images F1 to F3 according to preset calculation formulae of, for example, the pattern matching method or the gradient method. The computed correction rates 'ua', 'va', and 'δa' are stored as translational correction rate data and rotational correction rate data in a predetermined area of the memory (not shown). The method of estimating the correction rates is described in detail below.

C2. Method of Estimating Correction Rates

Figure 5:
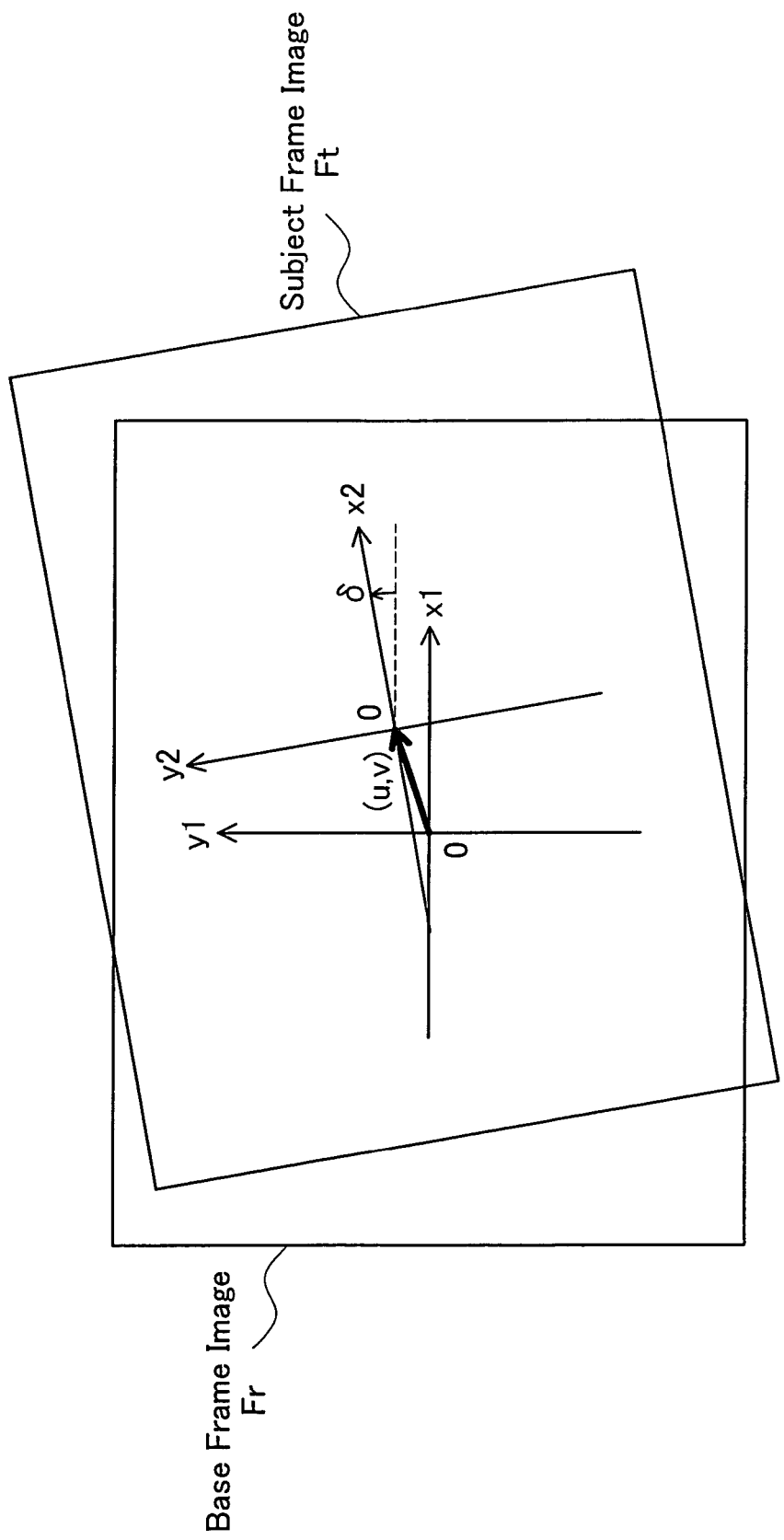
FIG. 5 is an explanatory drawing showing correction rates of a subject frame image relative to a base frame image.

FIG. 5 is an explanatory drawing showing correction rates of a subject frame image relative to a base frame image. In this illustrated example, a corrected subject frame image Ft is superposed over a base frame image Fr after elimination of translational shifts and a rotational shift. Orthogonal coordinates (x2,y2) having an axis x2 in the lateral direction and an axis y2 in the vertical direction from the center of the subject frame image Ft as the origin are deviated from orthogonal coordinates (x1,y1) having an axis x1 in the lateral direction and an axis y1 in the vertical direction from the center of the base frame image Fr as the origin. A translational correction rate in the lateral direction, a translational correction rate in the vertical direction, and a rotational correction rate about the center of the subject frame image Ft as the origin are respectively expressed by u, v, and δ. Conversion equations of converting the coordinates on the subject frame image Ft into the coordinates on the base frame image Fr are given below, where the translational correction rates (u,v) and the rotational correction rate δ are variables:

$$x1 = \cos\delta \cdot (x2+u) - \sin\delta \cdot (y2+v) \quad (1)$$

$$y1 = \sin\delta \cdot (x2+u) + \cos\delta \cdot (y2+v) \quad (2)$$

There is a very little time difference between the base frame and the subject frame, so that δ is assumed to be a very little quantity. Such assumption gives $\cos\delta \approx 1$ and $\sin\delta \approx \delta$ and enables the above equations to be rewritten as:

$$x1 = (x2+u) - \delta \cdot (y2+v) \quad (3)$$

$$y1 = \delta \cdot (x2+u) + (y2+v) \quad (4)$$

The positional shift between the subject frame image Ft and the base frame image Fr is to be eliminated prior to superposition of the subject frame image Ft over the base frame image Fr. For the purpose of elimination of the positional shift, the coordinate data of each pixel included in the subject frame image Ft is converted into the coordinate data on the base frame image Fr according to Equations (3) and (4) given above.

The variables U, V, and δ in Equations (3) and (4) are estimated from pixel values (pixel data) of corresponding pixels in the base frame image Fr and in the subject frame image Ft, for example, tone values of luminance (luminance values), by application of the gradient method (this estimates the position of each pixel in a smaller unit than the unit of one pixel) and the least square method.

FIG. 6 is an explanatory drawing showing estimation of the translational correction rates by the gradient method. FIG. 6(A) shows pixels and their luminance values of the base frame image Fr and the subject frame image Ft. In the illustrated example of FIG. 6(A), (x1i,y1i) represents coordinates of a certain pixel on the base frame image Fr, and B1(x1i,y1i) represents the luminance value of the certain pixel, where 'i' denotes a numeral allocated to each pixel for the purpose of identification. FIG. 6(B) shows the principle of the gradient method.

In this illustrated example, a pixel having coordinates (x2i, y2i) on the subject frame image Ft is located between coordinates (x1i,y1i) and coordinates (x1i+1,y1i+1) on the base frame image Fr, that is, at coordinates (x1i+Δx,y1i+Δy) between adjacent pixels.

As shown in the left drawing of FIG. 6(B), on the assumption that the pixel having coordinates (x2i,y2i) on the subject frame image Ft is located between coordinates (x1i,y1i) and coordinates (x1i+1,y1i) on the base frame image Fr, that is, at coordinates (x1i+Δx,y1i) between adjacent pixels, $$Px = B1(x1i+1,y1i) - B1(x1i,y1i) \quad (5)$$

Equation (5) given above is rewritten as:

$$Px \cdot \Delta x = B2(x2i,y2i) - B1(x1i,y1i) \quad (6)$$

The translational correction rate (Δx=u) in the lateral direction of the subject frame image Ft is determined by computing Δx according to Equation (7) given below:

$$\{Px \cdot \Delta x - (B2-B1)\}^2 = 0 \quad (7)$$

where B1 and B2 represent B1(x1i,y1i) and B2(x2i,y2i). The actual procedure computes Δx with regard to all the pixels and averages the computed values Δx to determine the translational correction rate u in the lateral direction.

In a similar manner, as shown in the right drawing of FIG. 6(B), on the assumption that the pixel having the coordinates (x2i,y2i) on the subject frame image Ft is located between coordinates (x1i,y1i) and coordinates (x1i,y1i+1) on the base frame image Fr, that is, at coordinates (x1i,y1i+Δy) between adjacent pixels, $$Py = B1(x1i,y1i+1) - B1(x1i,y1i) \quad (8)$$

Equation (8) given above is rewritten as:

$$Py \cdot \Delta y = B2(x2i,y2i) - B1(x1i,y1i) \quad (9)$$

The translational correction rate (Δy=v) in the vertical direction of the subject frame image Ft is determined by computing Δy according to Equation (10) given below:

$$\{Py \cdot \Delta y - (B2-B1)\}^2 = 0 \quad (10)$$

where B1 and B2 represent B1(x1i,y1i) and B2(x2i,y2i). The actual procedure computes Δy with regard to all the pixels and averages the computed values Δy to determine the translational correction rate v in the vertical direction.

The above description is on the assumption of a positional shift in only one of the x-axis direction (the lateral direction) and the y-axis direction (the vertical direction). In the case of a positional shift in both the x-axis direction and the y-axis direction, Δx and Δy that minimize Equation (11) given below are computed by the least square method:

$$S^2 = \Sigma\{Px \cdot \Delta x + Py \cdot \Delta y - (B2-B1)\}^2 \quad (11)$$

The values (Δx,Δy) thus obtained are equivalent to the translational correction rates (u,v).

This is the method of computing the translational correction rates (u,v) to translate the subject frame image Ft in both the x-axis direction and the y-axis direction relative to the base frame image Fr prior to superposition. The subject frame image Ft is also rotationally transferred relative to the base frame image Fr prior to superposition. The method of computing the rotational correction rate is described below.

Figure 7:
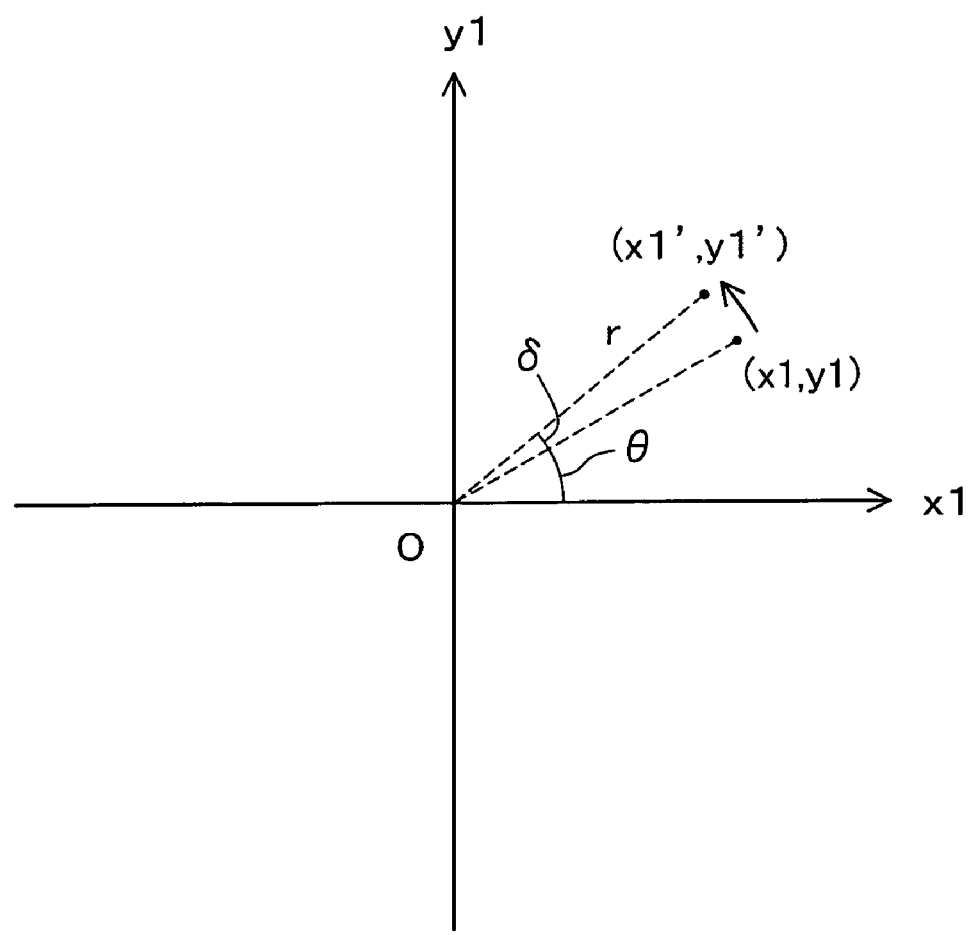
FIG. 7 is an explanatory drawing showing a rotational correction rate of a pixel.

FIG. 7 is an explanatory drawing showing a rotational correction rate of a certain pixel. A distance r between coordinates (x1,y1) and the origin O on the base frame image Fr and a rotational angle θ from the x1 axis are given as:

$$r=(x1^2+y1^2)^{1/2} \quad (12)$$

$$\theta=\tan^{-1}(y1/x1) \quad (13)$$

It is here assumed that the subject frame image Ft does not have any translational shifts but has only a rotational shift relative to the base frame image Fr. The pixel having the coordinates (x2i,y2i) on the subject frame image Ft is located at coordinates (x1',y1') on the base frame image Fr, which is rotated by a rotational correction rate δ from the coordinates (x1,y1). A distance Δx in the x1-axis direction and a distance Δy in the y1-axis direction by the rotational correction rate δ are given as:

$$\Delta x = x1'-x1 \approx -r\cdot\delta\sin\theta = -\delta\cdot y1 \quad (14)$$

$$\Delta y = y1'-y1 \approx r\cdot\delta\cos\theta = \delta\cdot x1 \quad (15)$$

Combination of the translational correction rates (u,v) with the rotational correction rate δ in Equations (14) and (15) gives the values Δx and Δy in Equation (11) as:

$$\Delta x = u-\delta\cdot y1 \quad (16)$$

$$\Delta y = v+\delta\cdot x1 \quad (17)$$

Substitution of Equations (16) and (17) into Equation (11) gives:

$$S^2=\Sigma\{Px\cdot(u-\delta\cdot y)+Py\cdot(v+\delta\cdot x)-(B2-B1)\}^2 \quad (18)$$

Correction rates u, v, and δ that minimize $S^2$ in Equation (18) are computed by the least square method, where (x1i, y1i) represent the coordinates on the base frame image Fr and the coordinate values and the luminance values of all the pixels included in the subject frame image Ft are substituted into Equation (18). Here 'i' denotes a numeral allocated to each pixel for the purpose of identification. The correction rates u, v, and δ are expressed as:

$$u=\{(m_\delta\cdot M02-m_v^2)\cdot c_u+(m_u\cdot m_v-m_\delta\cdot M11)\cdot c_v+(m_v\cdot M11-m_u\cdot M02)\cdot c_\delta\}/d \quad (19)$$

$$v=\{(m_u\cdot m_v-m_\delta\cdot M11)\cdot c_u+(m_\delta\cdot M20-m_u^2)\cdot c_v+(m_u\cdot M11-m_v\cdot M20)\cdot c_\delta\}/d \quad (20)$$

$$\delta=\{(m_v\cdot M11-m_v\cdot M02)\cdot c_u+(m_u\cdot M11-m_v\cdot M20)\cdot c_v+(M20\cdot M02-M11^2)\cdot c_\delta\}/d \quad (21)$$

Here M02, M11, M20, $m_u$, $m_v$, $m_\delta$, $c_u$, $c_v$, $c_\delta$, and d are expressed as:

$$M20 = \sum_i Px_i^2 \quad (22)$$

$$M11 = \sum_i Px_i\cdot Py_i \quad (23)$$

$$M02 = \sum_i Py_i^2 \quad (24)$$

$$m_u = \sum_i k_i\cdot Px_i \quad (25)$$

$$m_v = \sum_i k_i\cdot Py_i \quad (26)$$

$$m_\delta = \sum_i k_i^2 \quad (27)$$

$$c_u = \sum_i Px_i\cdot Pt_i \quad (28)$$

$$c_v = \sum_i Py_i\cdot Pt_i \quad (29)$$

$$c_\delta = \sum_i k_i\cdot Pt_i \quad (30)$$

$$d = m_\delta\cdot(M20\cdot M02-M11^2)- (m_u\cdot M02-2m_u\cdot m_v\cdot M11+m_v^2\cdot M20) \quad (31)$$

$$Pt_i = B2-B1 \quad (32)$$

$$k_i = x_i\cdot Py_i - y_i\cdot Px_i \quad (33)$$

The translational correction rates (u,v) and the rotational correction rate (δ), which are used to eliminate translational shifts of less than one pixel and a rotational shift between the subject frame image Ft and the base frame image Fr, are computed with high accuracy according to Equations (18) to (33) given above by the least square method.

The translational correction rates and the rotational correction rate are estimated in the above manner in the event of translational shifts of less than one pixel between the subject frame image Ft and the base frame image Fr. The preferable procedure roughly corrects translational shifts in the unit of one pixel according to the conventional pattern matching method, prior to execution of the above estimation technique.

D. Motion Follow-Up Composition Process of First Embodiment

For the clear explanation and the better understanding of the motion follow-up composition technique of this embodiment, the outline and a potential problem of motion non-follow-up composition are described first.

D1. Outline and Potential Problem of Motion Non-Follow-Up Composition

The composition process basically corrects subject frame image data with estimated correction rates to eliminate a positional shift of the subject frame image data relative to base frame image data, and superposes the corrected subject frame image data on the base frame image data to generate still image data. A preset interpolation is executed with regard to pixels that are neither in the base frame image nor in the subject frame images among pixels constituting a resulting still image (hereafter referred to as 'constituent pixels'). The preset interpolation uses pixel data representing pixel values of surrounding pixels that are present in the vicinity of the constituent pixels (that is, tone data representing tone values). This basic composition process is described briefly with reference to FIGS. 8 and 9.

Figure 8:
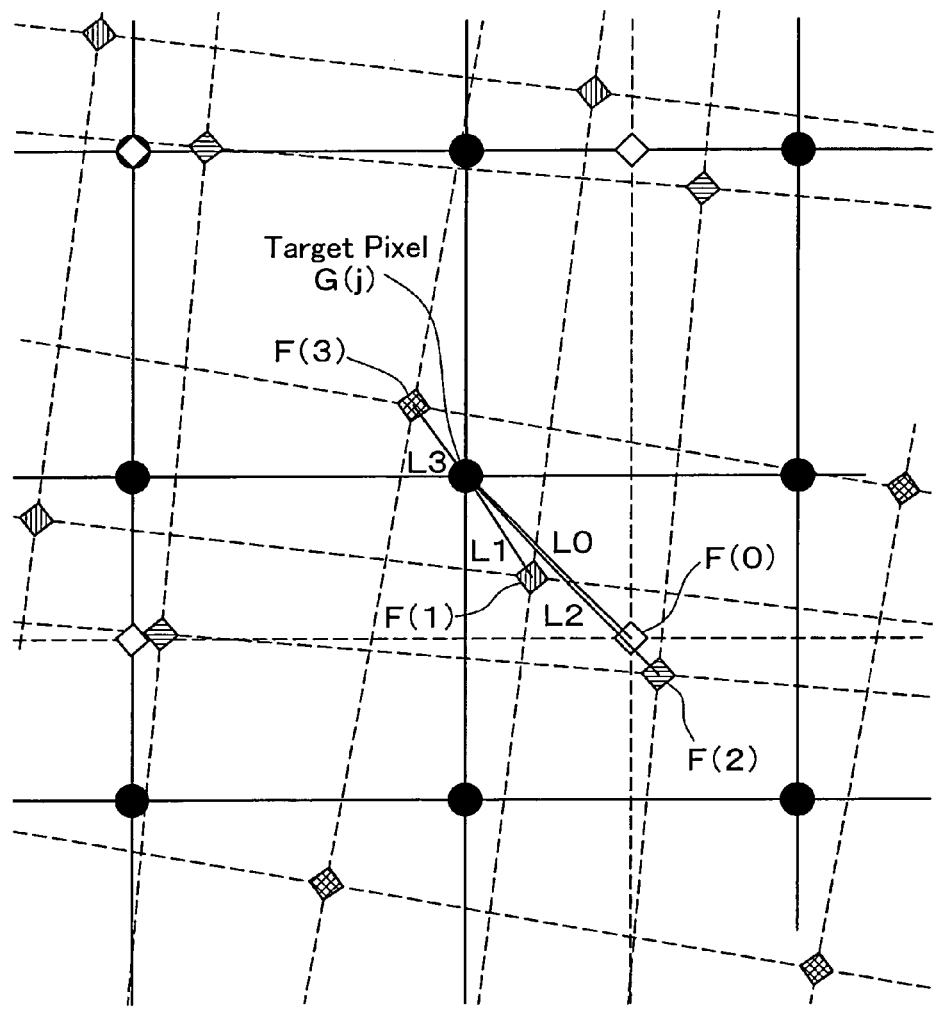
FIG. 8 is an explanatory drawing showing superposition of corrected subject frame images F1 to F3 on a base frame image F0 after elimination of the positional shift.

FIG. 8 is an explanatory drawing showing superposition of the corrected subject frame images F1 to F3 on the base frame image F0 after elimination of the positional shift. In the illustration of FIG. 8, closed circles, open boxes, and hatched boxes respectively represent constituent pixels of a resulting image G, pixels included in the base frame image F0, and pixels included in the corrected subject frame images F1 to F3. In the description of the motion non-follow-up composition technique and subsequent description of motion follow-up composition processes of the respective embodiments, the pixel density of the resulting image G is increased to 1.5 times in both length and width relative to the pixel density of the base frame image F0. The constituent pixels of the resulting image G are positioned to overlap the pixels of the base frame image F0 at intervals of every two pixel positions. The positions of the constituent pixels of the resulting image G are, however, not restricted to those overlapping the pixels of the base frame image F0 but may be determined according to various requirements. For example, all the pixels of the resulting image G may be located in the middle of the respective pixels of the base frame image F0. The rate of the resolution enhancement is not restricted to 1.5 times in length and width but may be set arbitrarily according to the requirements.

The following description mainly regards a certain pixel G(j) included in the resulting image G. A variable 'j' gives numbers allocated to differentiate all the pixels included in the resulting image G. For example, the number allocation may start from a leftmost pixel on an uppermost row in the resulting image G, sequentially go to a rightmost pixel on the uppermost row, and successively go from leftmost pixels to rightmost pixels on respective rows to terminate at a rightmost pixel on a lowermost row. The composition process detects adjacent pixels F(0), F(1), F(2), and F(3) of the respective frame images F0, F1, F2, and F3 adjoining to the certain pixel G(j) (hereafter referred to as the 'target pixel'), computes distances L0, L2, L2, and L3 between the detected adjacent pixels F(0), F(1), F(2), and F(3) and the target pixel G(j), and selects the adjacent pixel having the shortest distance (hereafter referred to as the 'nearest pixel'). In the illustrated example of FIG. 8, L3<L1<L0<L2. The pixel F(3) of the subject frame image F3 is accordingly selected as the nearest pixel to the target pixel G(j). The nearest pixel to the target pixel G(j) is hereafter expressed as F(3,i), which means the i-th pixel in the subject frame image F3. Here the numeral 'i' is different from the numeral 'i' allocated to each object pixel on the base frame image Fr in the correction rate estimation process described above.

This series of processing is repeatedly executed with regard to all the constituent pixels included in the resulting image G in the order of the number allocated to the target pixel G(j), where j=1, 2, 3, ... to select nearest pixels to all the constituent pixels.

Pixel data of each target pixel G(j) is generated from pixel data of the selected nearest pixel and pixel data of other pixels in the frame image including the selected nearest pixel, which surround the target pixel G(j), by any of diverse interpolation techniques, for example, the bilinear method.

Figure 9:
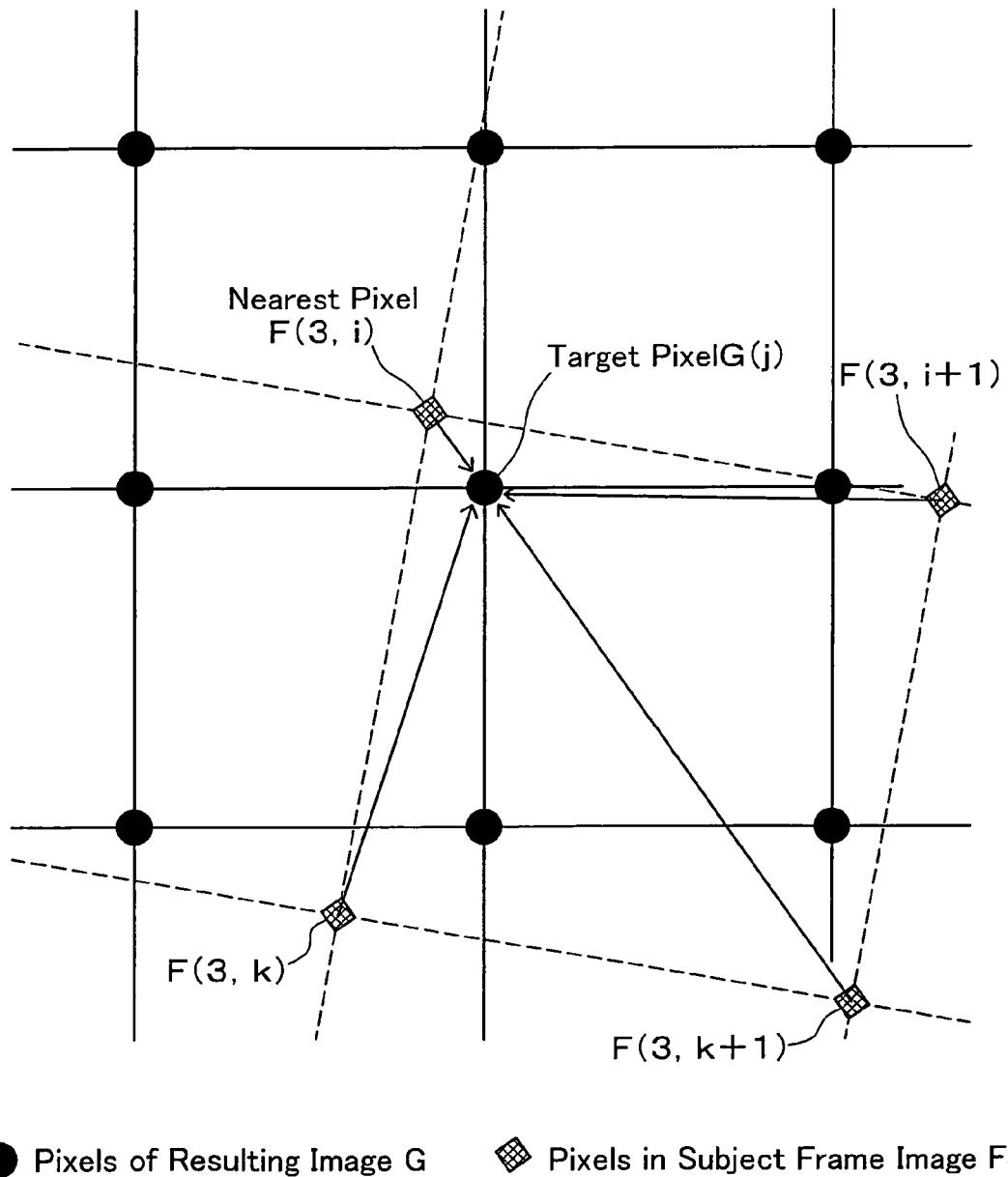
FIG. 9 is an explanatory drawing showing interpolation by the bilinear method.

FIG. 9 is an explanatory drawing showing interpolation by the bilinear method. The target pixel G(j) is not present in any of the base frame image F0 and the corrected subject frame images F1 to F3 after elimination of the positional shift. The target pixel G(j) accordingly has no pixel data. The composition process draws a virtual area defined by three other pixels F(3,i+1), F(3,k), F(3,k+1) in the subject frame image F3 surrounding the target pixel G(j), as well as by the nearest pixel F(3,i). The composition process then divides the virtual area into four divisions by the target pixel G(j), multiplies the pixel data at the respective diagonal positions by preset weights corresponding to the area ratio, and sums up the weighted pixel data to interpolate the pixel data of the target pixel G(j). Here k represents a numeral allocated to a pixel that is adjacent to the i-th pixel in the lateral direction of the subject frame image F3.

The technique of the interpolation is not restricted to the bilinear method, but any other suitable interpolation techniques, for example, the bicubic method and the nearest neighbor method, may be adopted for the same purpose.

Figure 10:
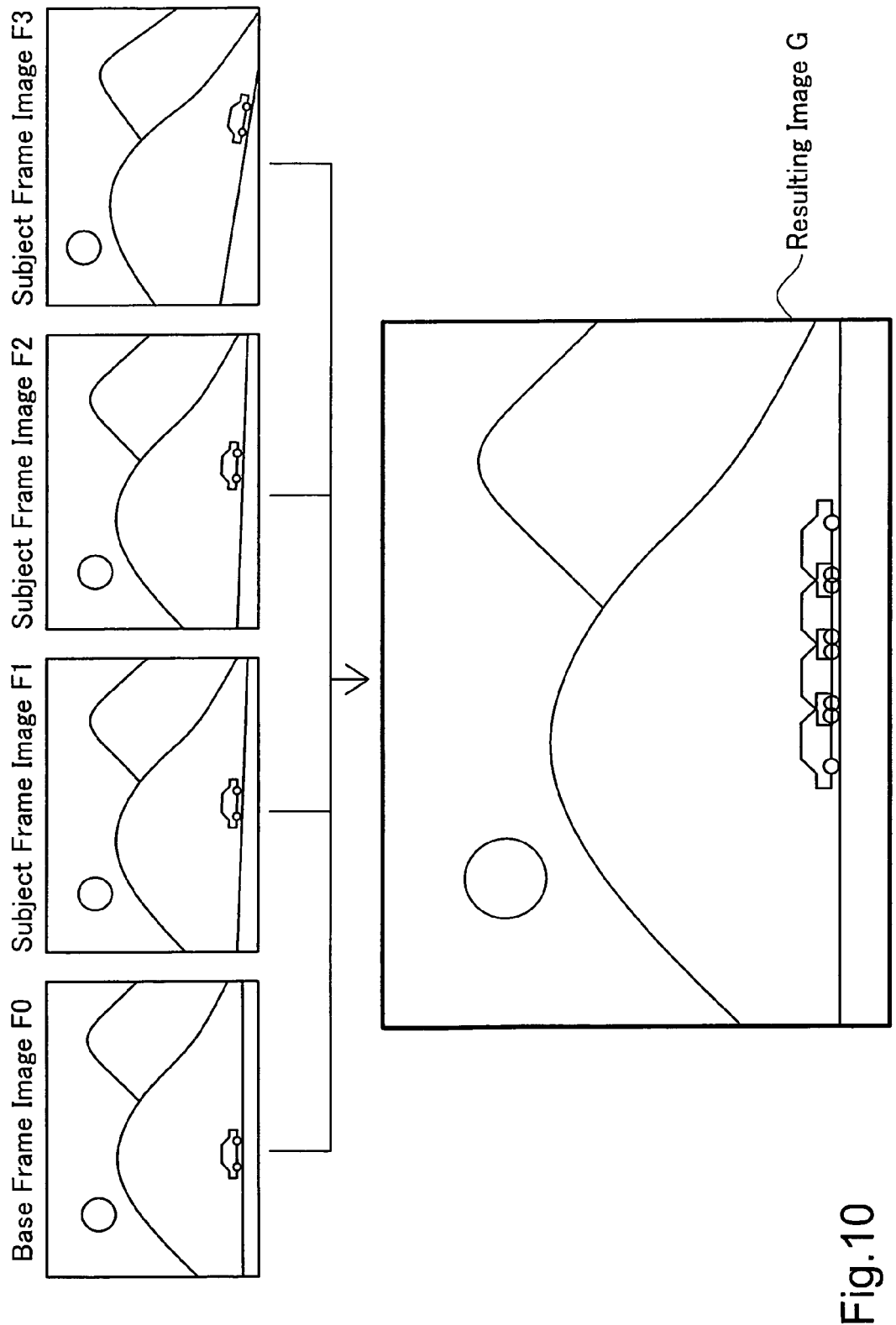
FIG. 10 is an explanatory drawing showing a potential problem of motion non-follow-up composition in the case of a significant level of motions between multiple frame images.

The motion non-follow-up composition technique described above may cause a problem. FIG. 10 is an explanatory drawing showing a potential problem of the motion non-follow-up composition in the case of a significant level of motions between multiple frame images. The lower row of the illustration shows a resulting image G obtained by the motion non-follow-up composition of four frame image F0 to F3 on the upper row. The four frame image F0 to F3 on the upper row show a moving picture of an automobile that moves from the left to the right on the screen. Namely the position of the automobile sequentially shifts. The motion non-follow-up composition makes interpolation of each target pixel with pixel data of a selected nearest pixel, whether the selected nearest pixel has motion or no motion between the frame images. The resulting image G accordingly has partial image overlaps of an identical automobile as shown in FIG. 10.

The motion follow-up composition technique of the invention effectively prevents such partial image overlaps of an identical subject, as discussed below.

D2. Procedure of Motion Follow-Up Composition

Figure 11:
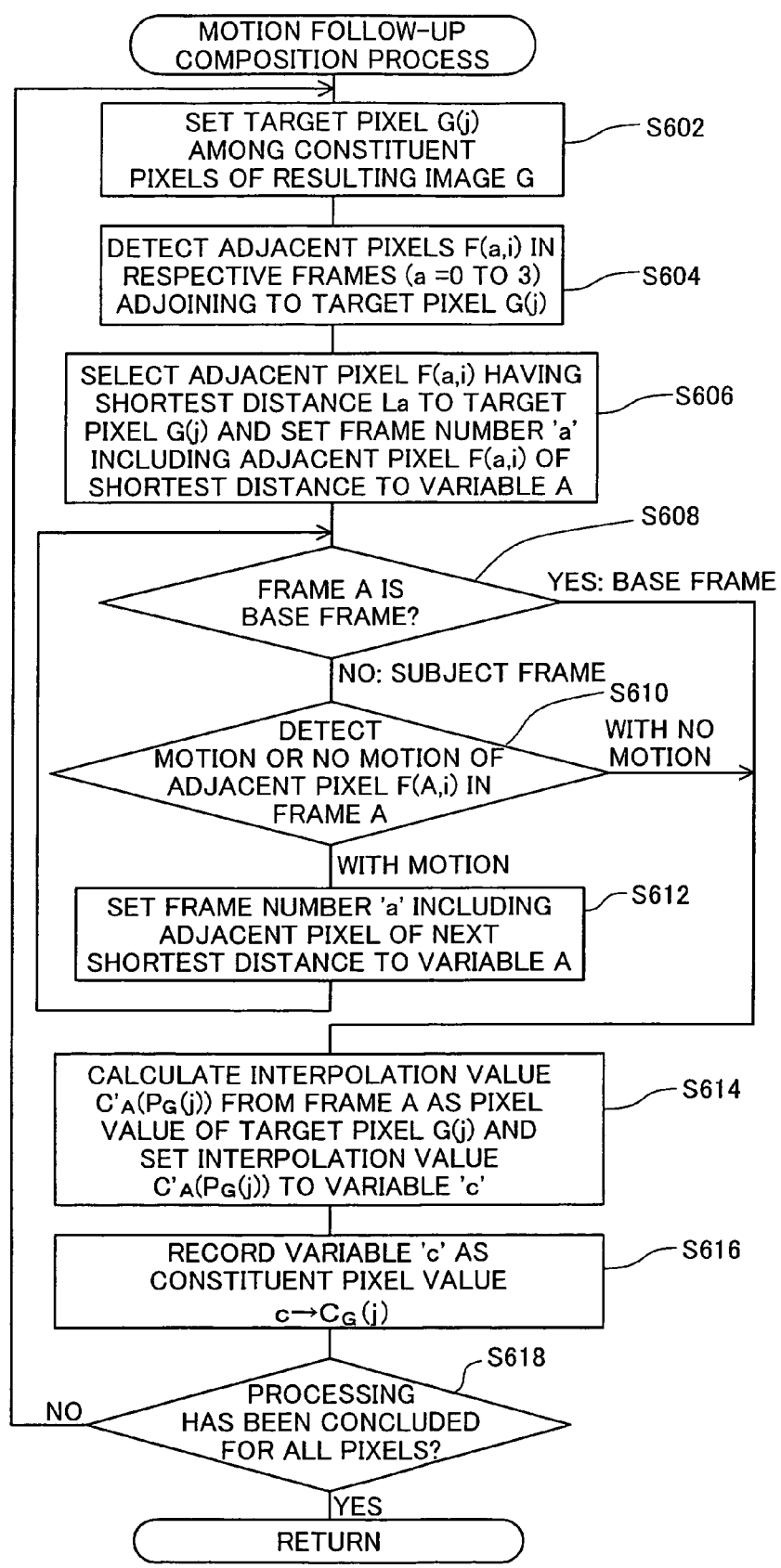
FIG. 11 is a flowchart showing the details of a motion follow-up composition process.

FIG. 11 is a flowchart showing the details of a motion follow-up composition process. In the respective embodiments discussed below, a resulting image G is obtained by combining the four frame images F0 to F3 shown in FIG. 10 and by increasing the pixel density of 1.5 times in both length and width relative to the base frame image F0 for the resolution enhancement.

The motion follow-up composition process first sets a target pixel G(j) among the constituent pixels of the resulting image G (step S602). The variable 'j' gives numbers allocated to differentiate all the pixels included in the resulting image G. For example, the number allocation may start from a leftmost pixel on an uppermost row in the resulting image G, sequentially go to a rightmost pixel on the uppermost row, and successively go from leftmost pixels to rightmost pixels on respective rows to terminate at a rightmost pixel on a lowermost row.

The motion follow-up composition process then detects adjacent pixels F(a,i) in respective frames 'a' having frame numbers of a variable 'a' (a=0, 1, 2, 3), which adjoin to the target pixel G(j) (step S604). Here the variable 'i' represents numbers allocated to differentiate all the pixels and is different from the variable 'i' in the correction rate estimation process. The adjacent pixel F(a,i) in the frame 'a' is detected by computing distances between respective pixels included in the frame 'a' and the target pixel G(j) and selecting a pixel having the shortest distance.

The motion follow-up composition process subsequently selects an adjacent pixel F(a,i) having a minimum distance La (hereafter referred to as the 'nearest pixel') to the target pixel G(j) among the detected adjacent pixels F(a,i) in the respective frames 'a', and sets the frame number 'a' of the frame including the nearest pixel to a variable 'A' (step S606).

The motion follow-up composition process determines whether the frame A having the frame number of the variable 'A' is a base frame (step S608). In the description hereof, the four frame images F0 to F3 shown on the upper row of FIG. 10 are combined to the resulting image G. When the frame A is the base frame, that is, the frame 0, the processing flow goes to step S614 described later. When the frame A is not the base frame but is a subject frame, that is, one of the frames 1 to 3, the motion follow-up composition process determines whether the adjacent pixel F(A,i) in the frame A or the nearest pixel has motion or no motion (step S610). In response to detection of no motion of the nearest pixel, the processing flow goes to step S614. In response to detection of a motion of the nearest pixel, on the other hand, the frame number 'a' of the frame including another adjacent pixel F(a,i) having the second shortest distance La is set to the variable A (step S612). The processing of steps S608 through S612 is repeatedly executed until the frame A is determined to be the base frame or until the adjacent pixel F(A,i) in the frame A is detected to have no motion. The details of the motion detection will be discussed later.

When the frame A is determined to be the base frame or when the adjacent pixel F(A,i) as an object pixel of motion detection is detected to have no motion, the motion follow-up composition process calculates an interpolation value $C'_A(P_G(j))$ from the frame image FA of the frame A as the pixel value of the target pixel G(j) and sets the calculated interpolation value $C'_A(P_G(j))$ to a variable 'c' (step S614). Here $C'_A(P_G(\ ))$ denotes a function of a selected interpolation technique, for example, the bilinear method or the bicubic method. The calculated interpolation value set in the variable 'c' is recorded as a constituent pixel value $C_G(j)$ of the target pixel G(j) (step S616).

The motion follow-up composition process determines whether the pixel value (pixel data) has been computed with regard to all the pixels included in the resulting image G (step S618). When there is any unprocessed pixel with no pixel value, the processing of steps S602 through S618 is repeatedly executed while the target pixel G(j) is sequentially shifted among the constituent pixels of the resulting image G. The motion follow-up composition process is terminated when pixel data has been computed with regard to all the pixels.

In the case of detection of a motion in a selected pixel to be used for interpolation of the pixel value of a target pixel, the motion follow-up composition process of this embodiment does not make interpolation with a subject frame image including the selected pixel detected to have a motion. Interpolation is made with a subject frame image including a selected pixel detected to have no motion. In the event of detection of a motion in all the subject frame images, interpolation is made with the base frame image. The motion follow-up composition process of this embodiment excludes the subject frame image including a selected pixel detected to have a motion from the object frame of the interpolation. This arrangement thus desirably prevents partial image overlaps of an identical moving subject, for example, the partial image overlaps of the identical automobile shown in the resulting image of FIG. 10.

The motion follow-up composition process of this embodiment sequentially selects an adjacent pixel in the order of the shorter distance to the target pixel and detects the motion of the selected adjacent pixel relative to the base image. Such selection is, however, not restrictive at all, and the motion detection may be executed in any suitable order. One modified procedure may simply select the adjacent pixel in the order of the frames 0, 1, 2, 3 for the motion detection. The motion follow-up composition process of this embodiment excludes the base frame including the selected adjacent pixel from the object of the motion detection. The base frame including the selected adjacent pixel may, however, be included in the object of the motion detection.

E. Motion Detection

Figure 12:
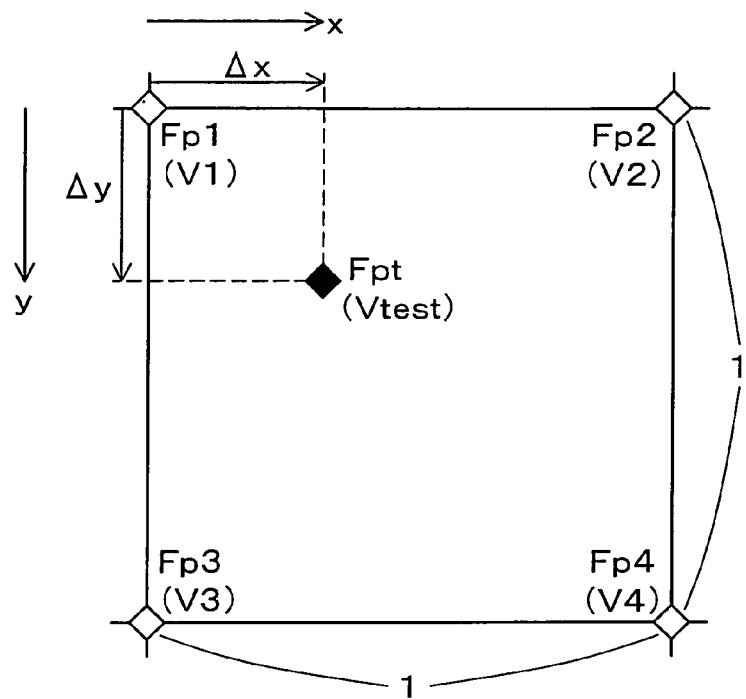
FIG. 12 is an explanatory drawing showing setting for description of motion detection methods.

Various methods are applicable to the motion detection executed at step S610 in the flowchart of FIG. 11. Five available methods of the motion detection are described here. FIG. 12 is an explanatory drawing showing setting for description of the motion detection methods. One closed box in FIG. 12 represents a pixel Fpt as an object of motion detection (hereafter referred to as 'object pixel') included in a corrected subject frame image Ft. Four open boxes arranged in a lattice represent four pixels Fp1, Fp2, Fp3, and Fp4 in a base frame image Fr to surround the object pixel Fpt. The object pixel Fpt has a luminance value Vtest, and the four pixels Fp1, Fp2, Fp3, and Fp4 respectively have luminance values V1, V2, V3, and V4. A position ($\Delta x, \Delta y$) in the lattice on the base frame image Fr is expressed by coordinates in a lateral axis 'x' and in a vertical axis 'y' in a value range of 0 to 1 relative to the position of the upper left pixel Fp1 as the origin.

For the simplicity of explanation, it is assumed that the object pixel Fpt has a one-dimensional position in the lattice on the base frame image Fr and is expressed by coordinates ($\Delta x, 0$) between the two pixels Fp1 and Fp2 aligned in the axis 'x'.

E1. Motion Detection Method 1

Figure 13:
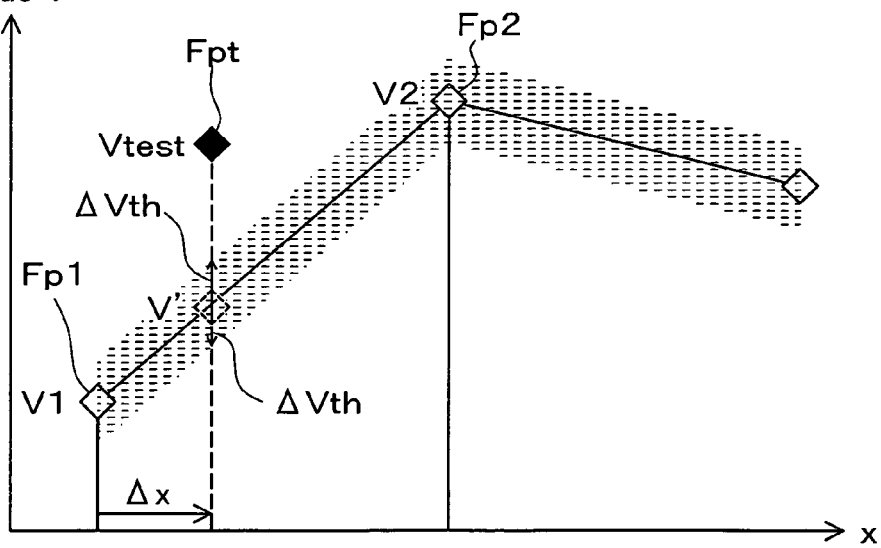
FIG. 13 is an explanatory drawing showing a first motion detection method.

FIG. 13 is an explanatory drawing showing a first motion detection method. When an object pixel Fpt has no motion, the luminance value Vtest of the object pixel Fpt is equal to an estimated luminance value V', which is computed from luminance values of nearby pixels in the base frame image Fr surrounding the object pixel Fpt by the bilinear method. When the object pixel Fpt has a motion, on the other hand, the luminance value Vtest of the object pixel Fpt is different from the estimated luminance value V' by a difference corresponding to a motion rate. These characteristics are used to detect motion or no motion of the object pixel Fpt as described below.

The estimated luminance value V' is calculated from the luminance values of pixels Fp1 and Fp2 in the base frame image Fr located adjacent to the object pixel Fpt according to Equation (34) representing one-dimensional linear interpolation:

$$V'=(1-\Delta x) \cdot V1 + \Delta x \cdot V2 \qquad (34)$$

where V1 and V2 denotes the luminance values of the pixels Fp1 and Fp2 in the base frame image Fr located adjacent to the object pixel Fpt, and $\Delta x$ represents the position of the object pixel Fpt between the two pixels Fp1 and Fp2 in the x-axis direction relative to the left pixel Fp1.

When the absolute value of the difference between the luminance value Vtest of the object pixel Fpt and the estimated luminance value V' is not smaller than a preset threshold value $\Delta Vth$, the object pixel Fpt is detected as a pixel with motion. Namely a pixel satisfying the following relational expression is detected as a pixel with no motion, while a pixel not satisfying the relational expression is detected as a pixel with motion:

$$|Vtest-V'|<\Delta Vth \qquad (35)$$

The pixel satisfying Expression (35) given above (the absolute value of the difference between the luminance value Vtest and the estimated luminance value V' is smaller than the preset threshold value $\Delta Vth$) is detected as the pixel with no motion, because of the following reason. As described above, the shift correction procedure executes correction with the estimated correction rates to eliminate the positional shift of the subject frame image Ft including the object pixel Fpt relative to the base frame image Fr and superposes the corrected subject frame image Ft over the base frame image Fr. In the ideal state, the positional shift between the frames is completely eliminated. In the actual state, however, complete elimination of the positional shift is practically impossible. There is a superposition error or another noise. Even when the object pixel has no motion, there may thus be a difference between the estimated luminance value V' and the luminance value Vtest of the object pixel Fpt.

In order to prevent such a noise-induced misdetection of the pixel motion, the plus and minus spans of the threshold value ΔVth about the estimated luminance value V' are specified as the no motion detection range.

The threshold value ΔVth is preferably set to about 3 when the luminance value may be in an 8-bit tone range, that is, in a range of 0 to 255. Such setting is, however, not restrictive at all, and the threshold value ΔVth may be set to any appropriate value according to the tone number of the luminance value and the accuracy of the positional shift correction.

In the example described above, the object pixel Fpt is assumed to have the coordinates (Δx,0) relative to the position of the pixel Fp1 in the base frame image Fr as the origin. The description is similarly applied to the object pixel Fpt having the coordinates (0,Δy).

When the object pixel Fpt has two-dimensional coordinates (Δx,Δy), the estimated luminance value V' may be calculated according to Equation (36) representing two-dimensional linear interpolation by the bilinear method:

$$V'=(1-\Delta x)\cdot(1-\Delta y)\cdot V1+\Delta x\cdot(1-\Delta y)\cdot V2+(1-\Delta x)\cdot \Delta y\cdot V3+\Delta x\cdot \Delta y\cdot V4 \quad (36)$$

The no motion detection range may be varied by varying the threshold value ΔVth according to a time difference 'm' between each subject frame image Ft including the object pixel Fpt and the base frame image Fr:

$$\Delta Vth=Wt(m)\cdot Vthr \quad (37)$$

Here 'm' denotes the time difference between the subject frame image Ft including the object pixel Fpt and the base frame image Ft on the assumption of a time interval '1' between frames. Wt(m) represents a load in the time difference 'm' and is equal to 1 in the time difference 'm'=0 and decreases with an increase in magnitude |m| of the time difference 'm' from 0. The load-time difference characteristic curve may have a linear variation or a non-linear variation (for example, a normal distribution). Vthr represents a reference level of the threshold value ΔVth in the time difference 'm'=0. The reference value Vthr is preferably set to about 8 when the luminance value may be in the 8-bit tone range, that is, in the range of 0 to 255. Such setting is, however, not restrictive at all, and the reference value Vthr may be set to any appropriate value according to the tone number of the luminance value and the accuracy of the positional shift correction. The time difference 'm' may be given as a difference between a frame number allocated to the subject frame image Ft and a frame number allocated to the base frame image Fr in the sequence of frames. Namely 'm' may be any parameter representing the time difference between the subject frame image Ft including the object pixel Fpt and the base frame image Fr.

FIG. 14 is an explanatory drawing showing a variation in no motion detection range against the time difference 'm'. The illustrated example of FIG. 14 is on the assumption of the setting of the load Wt(m) given by:

$$Wt(m)=1-|m|\cdot 0.05 \quad (38)$$

Figure 14A:
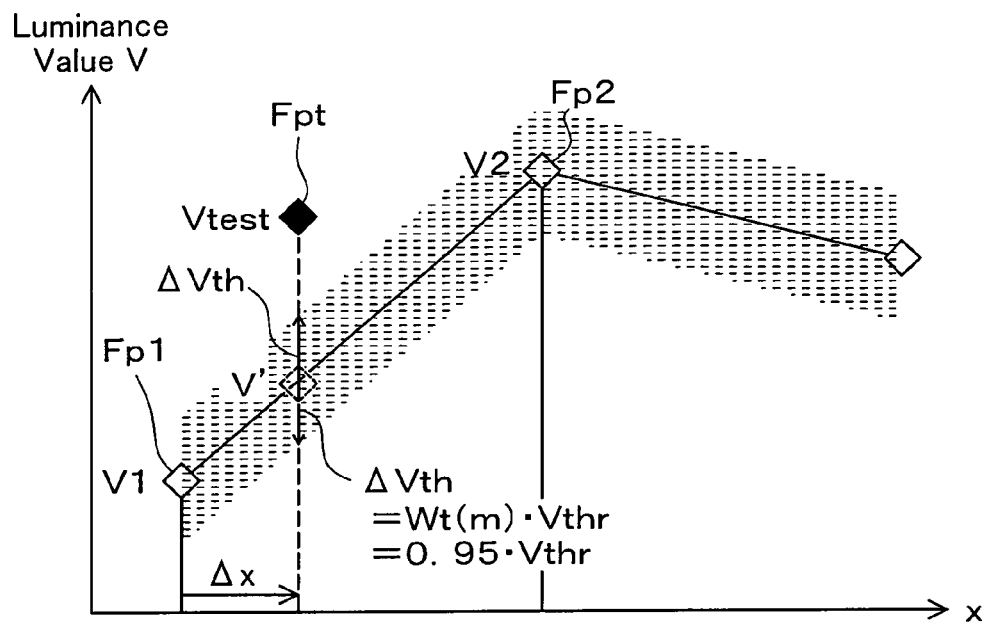
FIGS. 14(A) and 14(B) are explanatory drawings showing a variation in no motion detection range against a time difference 'm'.

When m=1, that is, when the subject frame image Ft is the subject frame image F1 of the frame 1 (see FIG. 10), the calculations of Equation (38) and Equation (37) respectively give the load Wt(1)=0.95 and the threshold value ΔVth= (0.95·Vthr). The plus and minus spans of the threshold value ΔVth (=0.95·Vthr) about the estimated luminance value V' are accordingly specified as the no motion detection range as shown in FIG. 14(A).

Figure 14B:
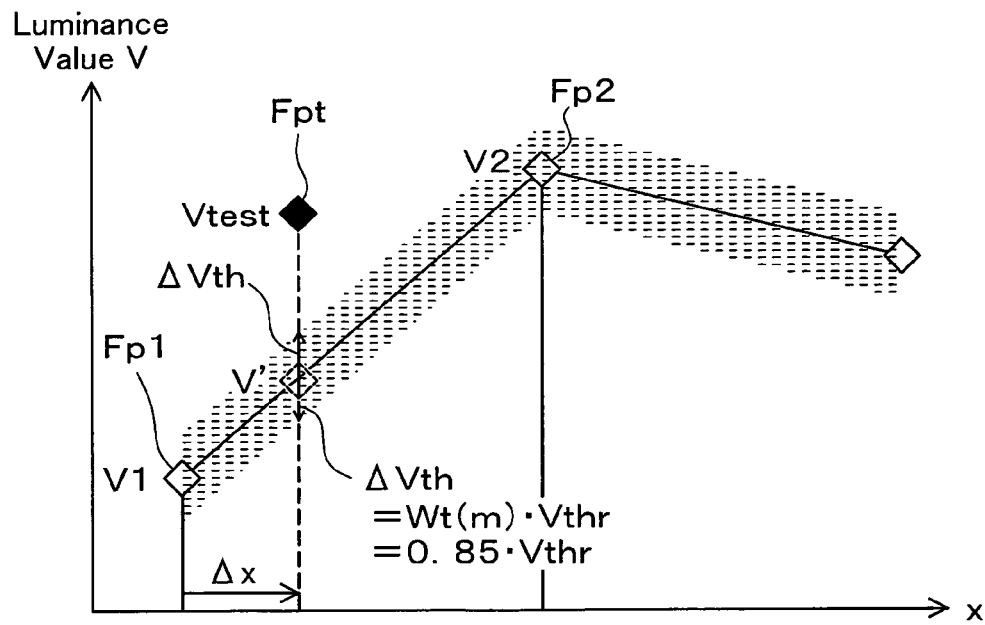

When m=3, that is, when the subject frame image Ft is the subject frame image F3 of the frame 3 (see FIG. 10), the calculations of Equation (38) and Equation (37) respectively give the load Wt(3)=0.85 and the threshold value ΔVth= (0.85·Vthr). The plus and minus spans of the threshold value ΔVth (=0.85·Vthr) about the estimated luminance value V' are accordingly specified as the no motion detection range as shown in FIG. 14(B).

The no motion detection range is varied by varying the threshold value ΔVth according to the time difference 'm' between each subject frame image Ft including the object pixel Fpt and the base frame image Fr in this manner.

The consecutive frames of a moving picture generally have a gradual change. It is thus highly probable that a subject frame image having a greater time difference in a sequence of frame images from the base frame image has a more significant level of motion. This motion detection method decreases the setting of the threshold value ΔVth and accordingly narrows the specified no motion detection range with an increase in time difference 'm' between the subject frame image Ft and the base frame image Fr. This arrangement reduces the effect of the motion to a greater extent in the subject frame image having the greater time difference in the sequence of frame images from the base frame image on a resulting composite image.

The above description is on the premise that the frame image F0 of the head frame among the four frame images F0 to F3 is the base frame image and the frame images F1 to F3 of the subsequent frames 1 to 3 are the subject frame images. In the illustrated example of FIG. 14, the time difference 'm' accordingly has a positive numeral of not greater than 3. This premise is, however, not essential. When the base frame image is the frame image F1 of the frame 1 or the frame image F2 of the frame 2, a subject frame image before the base frame image has a negative value of the time difference 'm'. When there are a greater number of frame images than 4, the time difference 'm' has a numeral of greater than 3. In such cases, the load is set to have a characteristic change with a variation in time difference 'm' between 0 and a maximum.

E2. Motion Detection Method 2

Figure 15:
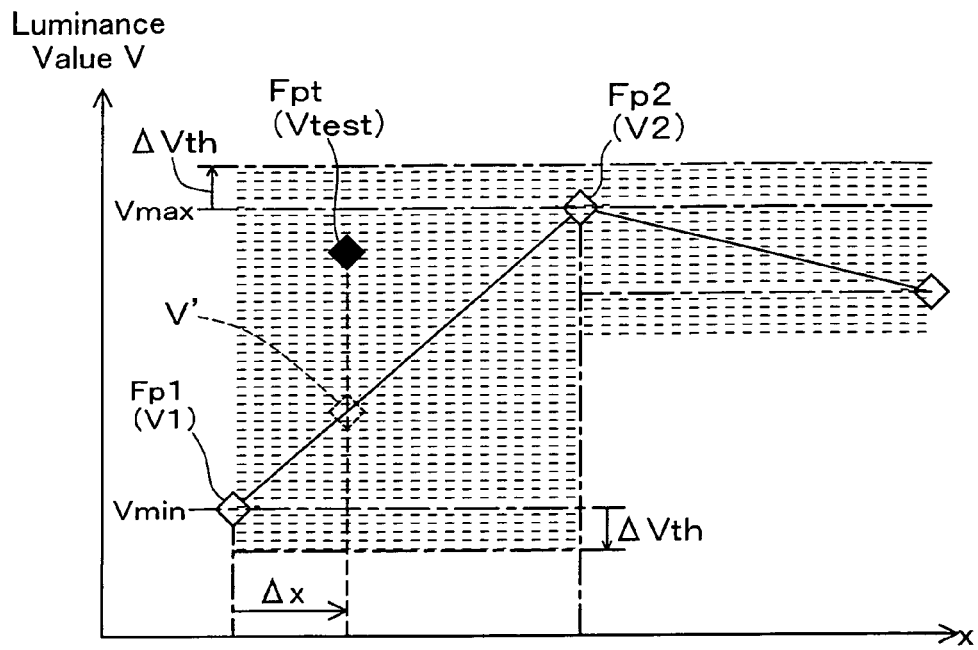
FIG. 15 is an explanatory drawing showing a second motion detection method.

FIG. 15 is an explanatory drawing showing a second motion detection method. An object pixel in a subject frame is expected to have an intermediate luminance value between luminance values of adjacent pixels in a base frame adjoining to the object pixel, unless there is a spatially abrupt change in luminance value. Based on such expectation, a range between a maximum and a minimum of the luminance values of the adjacent pixels close to the object pixel is assumed as the no motion detection range. Like the first motion detection method, in order to prevent a noise-induced misdetection, the assumed no motion detection range may be extended by the span of the threshold value ΔVth. The presence of the luminance value Vtest of the object pixel Fpt out of or within the no motion detection range detects motion or no motion of the object pixel Fpt, as described below.

A maximum Vmax and a minimum Vmin of the luminance values of two pixels Fp1 and Fp2 in the base frame adjoining to the object pixel Fpt are computed according to equations given below:

$$Vmax=max(V1,V2) \quad (39)$$

$$Vmin=min(V1,V2) \quad (40)$$

where max( ) and min( ) respectively represent a function of determining a maximum among the elements in the brackets and a function of determining a minimum among the elements in the brackets.

The object pixel Fpt is detected as the pixel with motion when the luminance value Vtest of the object pixel Fpt satisfies the following two relational expressions, while otherwise being detected as the pixel with no motion:

$$Vtest>Vmin-\Delta Vth \quad (41)$$

$$Vtest<Vmax+\Delta Vth \quad (42)$$

In the example described above, the object pixel Fpt is assumed to have the coordinates ($\Delta x$,0) relative to the position of the pixel Fp1 in the base frame image Fr as the origin. The description is similarly applied to the object pixel Fpt having the coordinates (0,$\Delta y$).

With regard to the object pixel Fpt having the two dimensional coordinates ($\Delta x$,$\Delta y$), the maximum Vmax and the minimum Vmin of the luminance values are given by:

$$V\text{max} = \max(V1, V2, V3, V4) \quad (43)$$

$$V\text{min} = \min(V1, V2, V3, V4) \quad (44)$$

E3. Motion Detection Method 3

Figure 16:
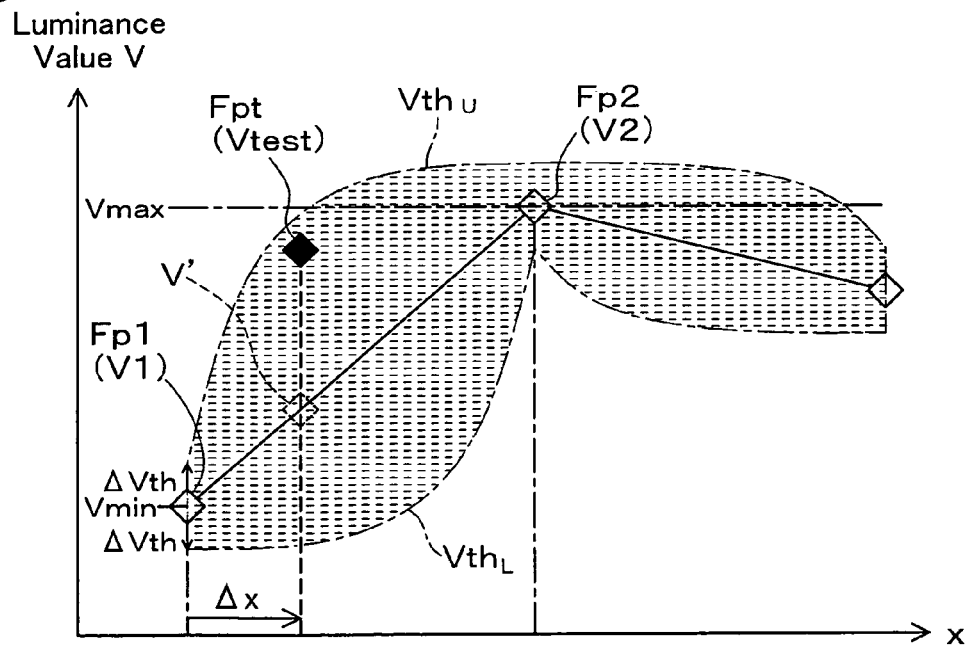
FIG. 16 is an explanatory drawing showing a third motion detection method.

FIG. 16 is an explanatory drawing showing a third motion detection method. In the first motion detection method, an intermediate position farther from the respective pixels at the lattice points in the base frame image Fr, that is, a position closer to the center between adjoining pixels, has a lower accuracy of the estimated luminance value. A possible technique of eliminating this drawback narrows the no motion detection range at the positions closer to the respective pixels in the base frame image Fr, while widening the no motion detection range at the positions farther from the respective pixels in the base frame image Fr. Like the first motion detection method, it is preferable to set the plus and minus spans of the threshold value $\Delta$Vth to the no motion detection range even at the positions closer to the respective pixels in the base frame image Fr. The presence of the luminance value Vtest of an object pixel Fpt out of or within the no motion detection range detects motion or no motion of the object pixel Fpt, as described below.

An upper limit $Vth_U(\Delta x)$ and a lower limit $Vth_L(\Delta x)$ of the motion detection about the estimated luminance value $V'(\Delta x)$ obtained in the first motion detection method are defined as:

$$Vth_U(\Delta x) = V'(\Delta x) + \Delta Vth\text{max} \cdot W(\Delta x) + \Delta Vth \quad (45)$$

$$Vth_L(\Delta x) = V'(\Delta x) - \Delta Vth\text{max} \cdot W(\Delta x) - \Delta Vth \quad (46)$$

$W(\Delta x)$ represents a function that gives a greater value at the position closer to the center, where $\Delta x$ varies in a range of 0 to 1. For example, the function $W(\Delta x)$ may be given as:

$$W(\Delta x) = 2 \cdot [1 - \{(1-\Delta x)^2 + \Delta x^2\}] = 4(1-\Delta x)\Delta x \quad (47)$$

Equation (45) given above is normalized to have the minimum value '0' and the maximum value '1' of the function W, where $\Delta x$ varies in a range of 0 to 1. The function expressed by Equation (47) is only an example and is not restrictive. $W(\Delta x)$ may be any function that gives a greater value at the position closer to the center, where $\Delta x$ varies in a range of 0 to 1.

$\Delta$Vthmax is expressed by:

$$\Delta Vth\text{max} = (V\text{max} - V\text{min})/2 \quad (48)$$

Here Vmax and Vmin represent the maximum and the minimum of the luminance values of the two pixels Fp1 and Fp2 in the base frame adjoining to the object pixel Fpt, which are computed according to Equations (39) and (40) given above in the second motion detection method.

The object pixel Fpt is detected as the pixel with motion when the luminance value Vtest of the object pixel Fpt satisfies the following two relational expressions, while otherwise being detected as the pixel with no motion:

$$V\text{test} > \Delta Vth_L(\Delta x) \quad (49)$$

$$V\text{test} < \Delta Vth_U(\Delta x) \quad (50)$$

In the example described above, the object pixel Fpt is assumed to have the coordinates ($\Delta x$,0) relative to the position of the pixel $F(a_R, i_R)$ in the base frame as the origin. The description is similarly applied to the object pixel Fpt having the coordinates (0,$\Delta y$).

With regard to the object pixel Fpt having the two dimensional coordinates ($\Delta x$,$\Delta y$), Equation (47) is expanded to a two-dimensional function $W(\Delta x, \Delta y)$:

$$W(\Delta x, \Delta y) = \quad (51)$$
$$(4/3) \cdot [1 - \{(1-\Delta x)^2 \cdot (1-\Delta y)^2 + (\Delta x)^2(1-\Delta y)^2 + (1+\Delta x)^2 \cdot$$
$$(\Delta y)^2 + (\Delta x)^2 \cdot (\Delta y)^2\}] =$$
$$(4/3) \cdot [1 - (1 - 2\Delta x + 2(\Delta x)^2) \cdot (1 - 2\Delta y + 2(\Delta y)^2)]$$

Here Vmax and Vmin represent the maximum and the minimum of the luminance values of the two pixels Fp1 and Fp2 in the base frame adjoining to the object pixel Fpt, which are computed according to Equations (43) and (44) given above in the second motion detection method.

In the case of the object pixel Fpt having the two-dimensional coordinates ($\Delta x$,$\Delta y$), the upper limit $Vth_U(\Delta x,\Delta y)$ may be greater than the maximum luminance value Vmax, while the lower limit $Vth_L(\Delta x,\Delta y)$ may be smaller than the minimum luminance value Vmin. In order to prohibit the luminance values out of the range between the minimum Vmin and the maximum Vmax, restriction of the upper limit $Vth_U(\Delta x,\Delta y)$ as given blow is desirable under the condition of $Vth_U(\Delta x,\Delta y) > V\text{max} + \Delta Vth$, $$Vth_U(\Delta x, \Delta y) = V\text{max} + \Delta Vth\text{noise} \quad (52)$$

Similarly restriction of the lower limit $Vth_L(\Delta x,\Delta y)$ as given blow is desirable under the condition of $Vth_L(\Delta x,\Delta y) < V\text{min} - \Delta Vth\text{noise}$, $$Vth_L(\Delta x, \Delta y) = V\text{min} - \Delta Vth\text{noise} \quad (53)$$

E4. Motion Detection Method 4

Figure 17:
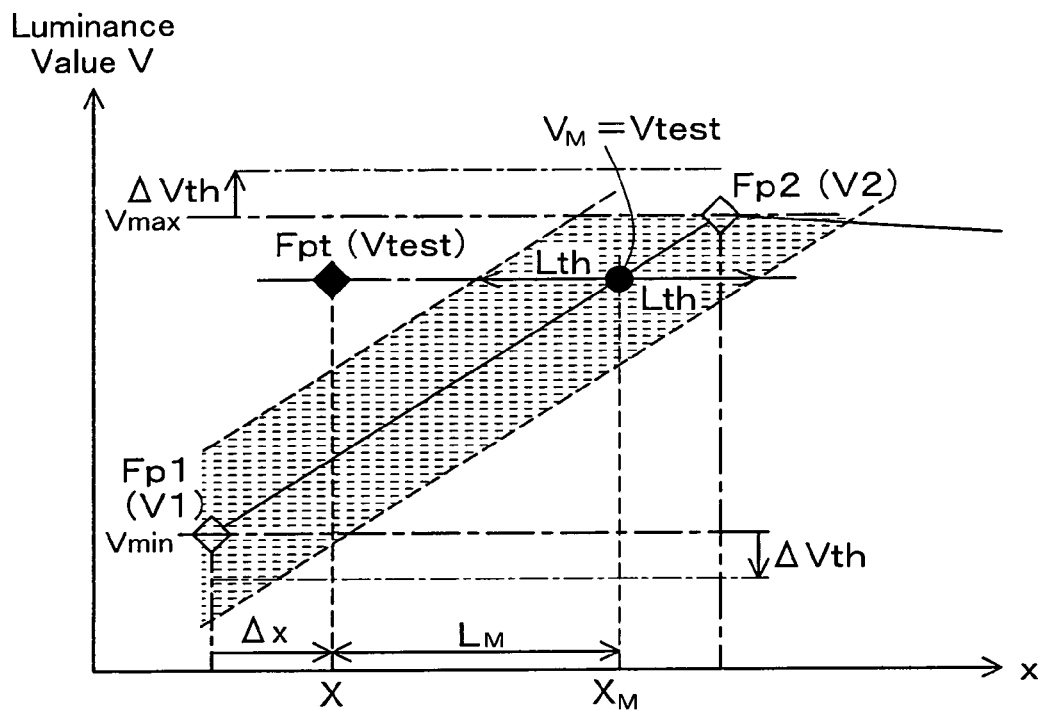
FIG. 17 is an explanatory drawing showing a fourth motion detection method.

FIG. 17 is an explanatory drawing showing a fourth motion detection method. There is generally a high potential of motion when an overall positional shift in the whole image does not match with a local positional shift in part of the image. By taking into account this fact, this motion detection method assumes a fixed luminance gradient between two pixels Fp1 and Fp2 in the base frame adjoining to an object pixel Fpt and computes a position $X_M$ of a pixel FM having a luminance value $V_M$ that is identical with the luminance value Vtest of the object pixel Fpt (hereafter the pixel $F_M$ is referred to as the estimated pixel and the distance $X_M$ is referred to as the estimated distance). A distance between the estimated position $X_M$ and a potentially varying position by the overall positional shift in the whole image is set to a threshold value Lth. Comparison of a distance $L_M$ between the object pixel Fpt and the estimated pixel $F_M$ with the threshold value Lth detects motion or no motion of the object pixel Fpt.

The second motion detection method is applied first to detect motion or no motion of the object pixel Fpt in the subject frame image Ft. In response to detection of no motion, the following motion detection is further carried out.

On the assumption of a fixed luminance gradient between the two pixels Fp1 and Fp2 in the base frame image Fr adjoining to the object pixel Fpt, the estimated position $X_M$ having the estimated luminance value $V_M$ that is identical with the luminance value Vtest of the object pixel Fpt is computed. The distance $L_M$ between the position X of the object pixel Fpt and the estimated position $X_M$ of the estimated pixel $F_M$ is given by:

$$L_M = |X_M - X| = |(V\text{test} - V1)/(V2 - V1) - \Delta x| \quad (54)$$

The distance $L_M$ thus calculated is compared with the threshold value Lth. The object pixel Fpt is determined to have a motion when $L_M > L$th, while being otherwise determined to have no motion.

In the example described above, the object pixel Fpt is assumed to have the coordinates ($\Delta x$,0) relative to the position of the pixel Fp1 in the base frame image Fr as the origin. The description is similarly applied to the object pixel Fpt having the coordinates (0,$\Delta y$).

With regard to the object pixel Fpt having the two dimensional coordinates ($\Delta x$,$\Delta y$), the motion detection method maps the luminance value Vtest onto the object pixel Fpt in both the direction of the 'x' axis (lateral direction) and the direction of the 'y' axis (vertical direction) relative to the position of the pixel Fp1 in the base frame image Fr as the origin, prior to the motion detection. The object pixel Fpt is detected as the pixel with motion in response to a detected motion in at least one of the direction of the 'x' axis and the direction of the 'y' axis, while otherwise the object pixel Fpt is detected as the pixel with no motion.

E5. Motion Detection Method 5

In the fourth motion detection method, the threshold value Lth may be varied according to target frame images to be composed. For example, the threshold value Lth is narrowed for frame images with a significant level of motions to reduce the image composition effect of multiple frames, while being widened for frame images with a low level of motions to enhance the image composition effect of multiple frames.

For example, in the case of composition of frame images of four frames, there are three subject frames, which go through the following series of processing.

The fourth motion detection method is applied to the motion detection with a preset standard threshold value Lth with regard to all the pixels included in all the subject frames (three frames). The method then counts the number of pixels $N_M$ detected as the pixel with motion.

A ratio R of pixels detected as the pixel with motion is calculated as:

$$R = N_M / N_{total} \quad (55)$$

where $N_{total}$ denotes the total number of pixels in the three subject frames.

The threshold value Lth is varied with the calculated ratio R according to the following equation, and the fourth motion detection method is applied to detect motion or no motion of each object pixel:

$$Lth = 1 - R^{1/2} \quad (56)$$

For example, when R=0.25, Lth=0.5 pixels.

Equation (56) is not restrictive but is only an example of calculating the threshold value varying with a variation in ratio R of the pixels detected as the pixel with motion. Any other suitable equation may otherwise be applied corresponding to the object of the processing.

Any of these motion detection methods described above may be applied to step 610 in FIG. 11. Selection of the motion detection method depends upon various motion-relevant characteristics of a target image as the object of the motion detection, for example, the level of motion and the size of a moving part. The selected motion detection method may be changed according to the target image.

F. Motion Follow-Up Composition Process of Second Embodiment

Figure 18:
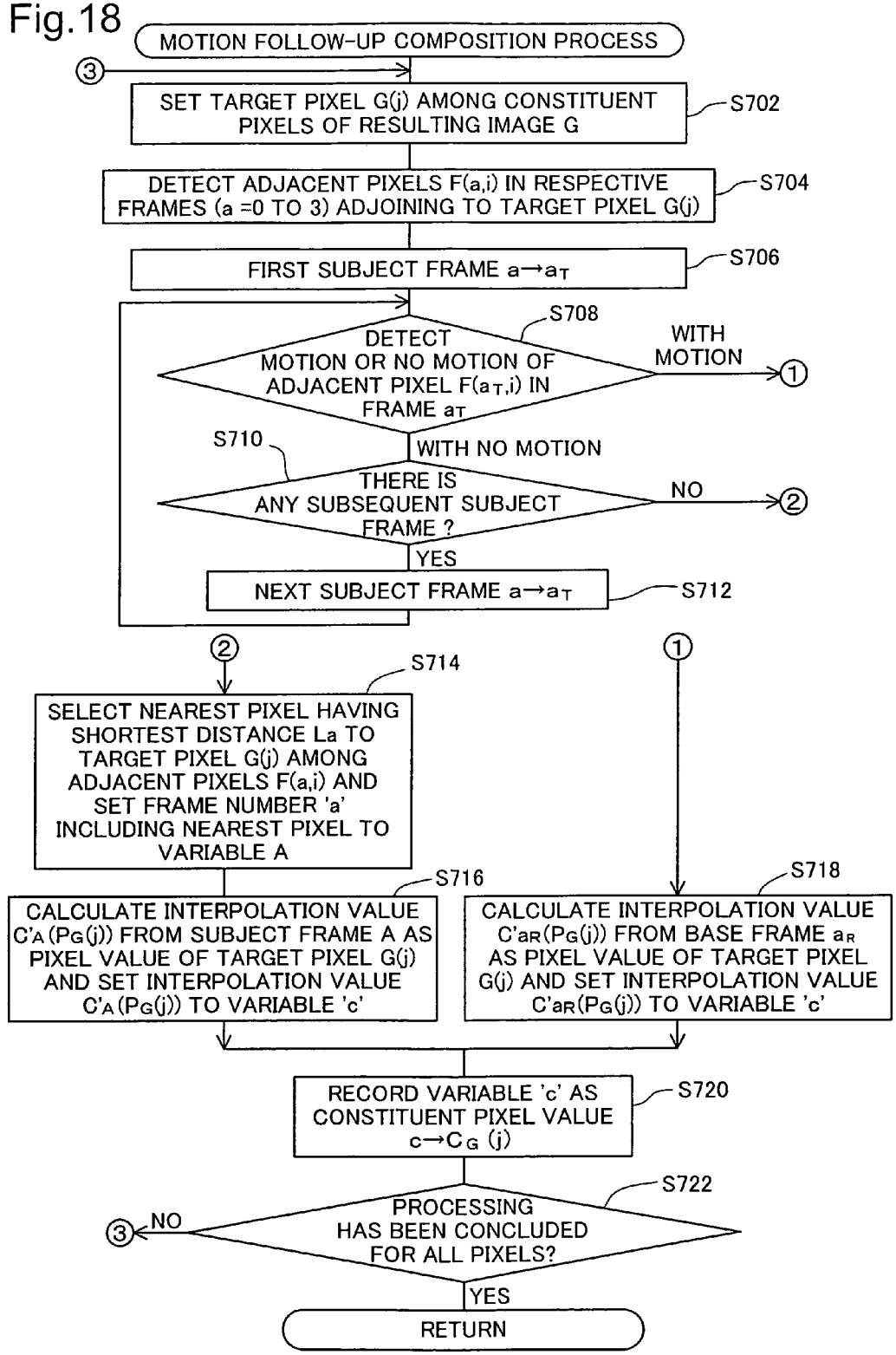
FIG. 18 is a flowchart showing the details of a motion follow-up composition process executed in a second embodiment of the invention.

FIG. 18 is a flowchart showing the details of a motion follow-up composition process executed in a second embodiment. Like the process of the first embodiment (step S602 in FIG. 11), the motion follow-up composition process of the second embodiment first sets a target pixel G(j) among the constituent pixels of a resulting image G (step S702).

Like the process of the first embodiment (step S604 in FIG. 11), the motion follow-up composition process of the second embodiment detects adjacent pixels F(a,i) in respective frames 'a' having frame numbers of a variable 'a' (a=0, 1, 2, 3), which adjoin to the target pixel G(j) (step S704).

The motion follow-up composition process subsequently selects one of subject frames other than a specified base frame as a first subject frame and sets the frame number 'a' of the selected first subject frame to a variable $a_T$ (step S706). For example, the frame 1 is selected as the first subject frame, and the frames 2 and 3 are sequentially selected as subsequent subject frames at step S712 described later. This selection sequence is, however, not essential. Any subject frame may be selected as the first subject frame, and subsequent subject frames may be selected in any order.

The motion follow-up composition process sets the adjacent pixel $F(a_T,i)$ in a frame $a_T$ having the frame number of the variable $a_T$, which adjoins to the target pixel G(j), to an object pixel and determines whether the object pixel has motion or no motion (step S708). Any of the motion detection methods described above may be applied to this motion detection.

In response to detection of a motion of the object pixel at step S708, the processing flow goes to step S718 described later. In response to detection of no motion of the object pixel, on the other hand, the motion follow-up composition process determines whether there is any non-selected subsequent subject frame (step S710). In the absence of any subsequent subject frame, the processing flow goes to step S714 described later.

In the presence of any subsequent subject frame at step S710, on the other hand, the motion follow-up composition process selects a next subject frame and sets the frame number 'a' of the selected subject frame to the variable $a_T$ (step S712). The processing of steps S708 to S712 is repeatedly executed until detection of a motion of the adjacent pixel $F(a_T,i)$ in the frame $a_T$ having the frame number of the variable $a_T$ or in the absence of any subsequent subject frame, that is, until detection of no motion of the adjacent pixels in all the subject frames.

When there is no subsequent subject frame at step S710, that is, when no motion is detected in the respective adjacent pixels in all the subject frames, the motion follow-up composition process selects a nearest pixel having a minimum distance La to the target pixel G(j) among the adjacent pixels F(a,i), and sets the frame number 'a' of the frame including the nearest pixel to a variable 'A' (step S714). The motion follow-up composition process then calculates an interpolation value $C'_A(P_G(j))$ from the frame image FA of the frame A as the pixel value of the target pixel G(j) and sets the calculated interpolation value $C'_A(P_G(j))$ to a variable 'c' (step S716).

In response to detection of a motion at step S708, the motion follow-up composition process calculates an interpolation value $C'a_R(P_G(j))$ from a base frame image $Fa_R$ as the pixel value of the target pixel G(j) and sets the calculated interpolation value C'$a_R$(P$_G$(j)) to the variable 'c' (step S718).

The calculated interpolation value set in the variable 'c' is recorded as a constituent pixel value C$_G$(j) of the target pixel G(j) (step S720).

Any of the diverse interpolation techniques, such as the bilinear method and the bicubic method, may be applied to calculation of the interpolation value as in step S614 of FIG. 11 described in the first embodiment.

The motion follow-up composition process determines whether the pixel value (pixel data) has been computed with regard to all the pixels included in the resulting image G (step S722). When there is any unprocessed pixel with no pixel value, the processing of steps S702 through S722 is repeatedly executed while the target pixel G(j) is sequentially shifted among the constituent pixels of the resulting image G. The motion follow-up composition process is terminated when pixel data has been computed with regard to all the pixels.

In the case of detection of a motion in a selected pixel to be used for interpolation of the pixel value of a target pixel G(j), the motion follow-up composition process of the second embodiment does not make interpolation with a subject frame image including the selected pixel detected to have a motion, in the same manner as the first embodiment. In this case, interpolation is made with a base frame image in the second embodiment. The motion follow-up composition process of this embodiment also excludes the subject frame image including a selected pixel detected to have a motion from the object frame of the interpolation. This arrangement thus desirably prevents partial image overlaps of an identical moving subject, for example, the partial image overlaps of the identical automobile shown in the resulting image of FIG. 10.

The motion follow-up composition process of the first embodiment makes interpolation with a subject frame image in a subject frame including the object pixel detected as the pixel with no motion, even when the object pixel in another subject frame is detected as the pixel with motion. The motion follow-up composition of the second embodiment, on the other hand, does not execute motion detection in the other subject frames but makes interpolation with the base frame image in the base frame, when the object pixel in one subject frame is detected as the pixel with motion. The arrangement of the second embodiment has the relatively limited effect of quality enhancement of the resulting image, while more effectively preventing the problem of the prior art technique, that is, the potential occurrence of partial image overlaps of an identical moving subject, compared with the arrangement of the first embodiment.

The motion follow-up composition process of the first embodiment makes interpolation based on a subject frame detected to have no motion, even when another subject frame is detected to have a motion. This arrangement of the first embodiment is expected to have the greater quality enhancement effect than the arrangement of the second embodiment.

G. Motion Follow-Up Composition Process of Third Embodiment

Figure 19:
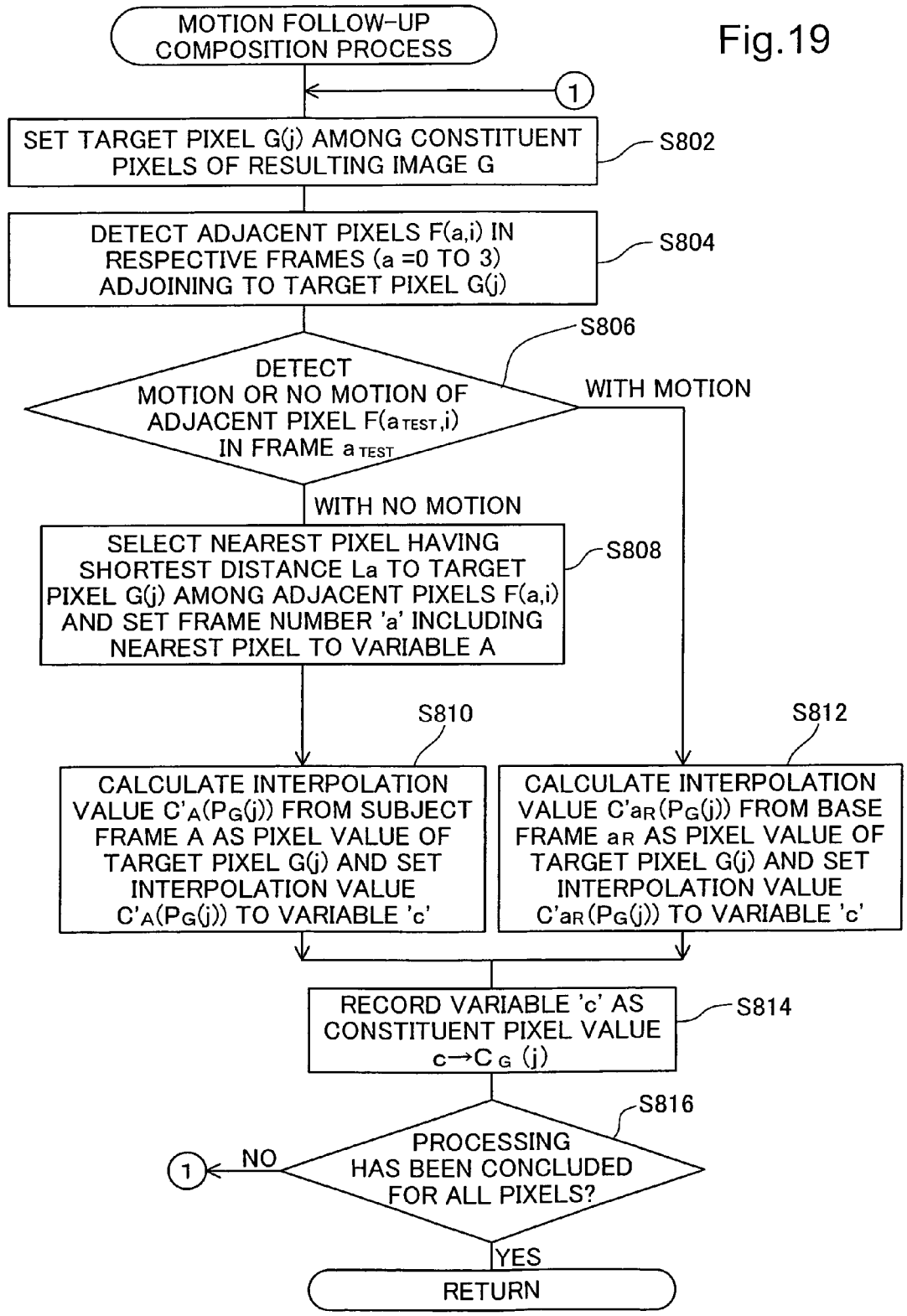
FIG. 19 is a flowchart showing the details of a motion follow-up composition process executed in a third embodiment of the invention.

FIG. 19 is a flowchart showing the details of a motion follow-up composition process executed in a third embodiment. Like the process of the first embodiment (step S602 in FIG. 11), the motion follow-up composition process of the third embodiment first sets a target pixel G(j) among the constituent pixels of a resulting image G (step S802).

Like the process of the first embodiment (step S604 in FIG. 11), the motion follow-up composition process of the second embodiment detects adjacent pixels F(a,i) in respective frames 'a' having frame numbers of a variable 'a' (a=0, 1, 2, 3), which adjoin to the target pixel G(j) (step S804).

The motion follow-up composition process determines whether an adjacent pixel F($a_{TEST}$,i) in a frame $a_{TEST}$ having a predetermined frame number $a_{TEST}$ of the variable 'a', which adjoins to the target pixel G(j), has motion or no motion (step S806). Any of the motion detection methods described above may be applied to this motion detection.

In response to detection of a motion of the adjacent pixel at step S806, the processing flow goes to step S812 described later. In response to detection of no motion, on the other hand, the motion follow-up composition process selects a nearest pixel having a minimum distance La to the target pixel G(j) among the adjacent pixels F(a,i), and sets the frame number 'a' of the frame including the nearest pixel to a variable 'A' (step S808). The motion follow-up composition process then calculates an interpolation value C'$_A$(P$_G$(j)) from the frame image FA of the frame A as the pixel value of the target pixel G(j) and sets the calculated interpolation value C'$_A$(P$_G$(j)) to a variable 'c' (step S810).

In response to detection of a motion at step S804, the motion follow-up composition process calculates an interpolation value C'$a_R$(P$_G$(j)) from a base frame image Fa$_R$ of a frame number $a_R$ as the pixel value of the target pixel G(j) and sets the calculated interpolation value C'$a_R$(P$_G$(j)) to the variable 'c' (step S812).

The calculated interpolation value set in the variable 'c' is recorded as a constituent pixel value C$_G$(j) of the target pixel G(j) (step S814).

Any of the diverse interpolation techniques, such as the bilinear method and the bicubic method, may be applied to calculation of the interpolation value as in step S614 of FIG. 11 described in the first embodiment.

The motion follow-up composition process determines whether the pixel value (pixel data) has been computed with regard to all the pixels included in the resulting image G (step S816). When there is any unprocessed pixel with no pixel value, the processing of steps S802 through S816 is repeatedly executed while the target pixel G(j) is sequentially shifted among the constituent pixels of the resulting image G. The motion follow-up composition process is terminated when pixel data has been computed with regard to all the pixels.

As described above, the motion follow-up composition process of the third embodiment detects motion or no motion of an object pixel in a specific subject frame and makes interpolation with a base frame image in response to detection of a motion. The motion follow-up composition process of this embodiment also excludes the subject frame image including a selected pixel detected to have a motion from the object frame of the interpolation. This arrangement thus desirably prevents partial image overlaps of an identical moving subject, for example, the partial image overlaps of the identical automobile shown in the resulting image of FIG. 10.

The motion follow-up composition process of the second embodiment may execute the motion detection with regard to all the subject frames. The results of the motion detection generally have a strong correction. The motion follow-up composition process of the third embodiment accordingly executes the motion detection with regard to only a specified subject frame. This effectively shortens the total processing time, compared with the processing flows of the other embodiments. A frame having a greatest time difference from the base frame is desirably selected as the specified subject frame.

H. Modifications

The embodiments and their modified examples discussed above are to be considered in all aspects as illustrative and not restrictive. There may be many other modifications, changes, and alterations without departing from the scope or spirit of the main characteristics of the present invention. Some examples of possible modification are given below.

(1) In the embodiments discussed above, in response to selection of a specific instance during the reproduction of a moving picture, the frame image acquisition module 104 obtains frame image data of four frames, which include a frame of the selected instance as a base frame and subsequent three frames aligned in a time series after the base frame. The frame image data may be obtained from the base frame and precedent three frames aligned in a time series before the base frame, or from the base frame and a total of three other frames aligned in a time series before and after the base frame. The number of frames is not limited to 4. The procedure may obtain frame image data of multiple frames of not less than 2 and generate still image data from the obtained frame image data of the multiple frames.

(2) In the embodiments discussed above, the procedure obtains frame image data of multiple frames and generates still image data from the obtained frame image data of the multiple frames. This is, however, not essential at all. One modified procedure may obtain image data of multiple frames in the form of image data of multiple fields constituting one frame (field image data) and generates still image data from the obtained field image data of the multiple fields.

(3) In the embodiments discussed above, the procedure detects motion or no motion of each object pixel included in a resulting image, which is generated by combining multiple frame images, and selects a frame image usable for calculation of a pixel value and generation of pixel data of the object pixel. This procedure is, however, not restrictive at all. One modified procedure may detect motion or no motion of each pixel in each subject frame image relative to a base frame image and select a frame image usable for calculation of a pixel value and generation of pixel data of each pixel in a resulting image, based on the results of the motion detection.

(4) In the embodiments discussed above, one high-resolution still image (expressed by still image data) is generated by combining images (expressed by image data) of multiple consecutive frames in a time series extracted among a moving picture (expressed by moving picture data). The technique of the invention is, however, not restricted to this example. One high-resolution image may be generated by combining multiple consecutive low-resolution images in a time series. The multiple consecutive low-resolution images in the time period may be, for example, multiple consecutive images serially taken with a digital camera.

The multiple consecutive low-resolution images (including frame images) in the time series may be replaced by multiple low-resolution images simply arrayed in the time series.

(5) In the embodiments discussed above, the motion detection is carried out with regard to one specified pixel in multiple frame images to generate pixel data of each target pixel included in a resulting image. One possible modification of the motion detection may divide each frame image into multiple blocks and detect motion or no motion of each block in a subject frame image relative to the corresponding block in a base frame image, prior to generation of pixel data of each target pixel included in a resulting image. The pixel data of the respective pixels included in each block of the resulting image detected as a block with motion are generated based on the base frame image. Any of diverse methods of computing the motion rate between multiple frames may be applied to the motion detection in each block.

(6) Part of the hardware configuration in any of the above embodiments may be replaced by equivalent software configuration, whereas part of the software configuration in any of the above embodiments may be replaced by equivalent hardware configuration. For example, the series of processing by the still image generation control module, the correction rate estimation module, and the motion follow-up composition module shown in FIG. 1 may be executed by hardware circuits.

(7) In the embodiments discussed above, the personal computer is used as the still image generation apparatus of the invention. The still image generation apparatus of the invention is, however, not limited to the personal computer but may be actualized by any of various computer systems included in, for example, digital video cameras, digital still cameras, and printers. A digital video camera constructed as the still image generation apparatus of the invention shoots a moving picture and generates one high-resolution still image from multiple frame images included in the moving picture simultaneously with the shooting or checking the results of shooting. A digital still camera constructed as the still image generation apparatus of the invention serially takes pictures of a subject and generates one high-resolution still image from multiple continuous images of the serially taken pictures simultaneously with the continuous shooting or checking the results of continuous shooting.

Finally the present application claims the priority based on Japanese Patent Application No. 2003-339907 filed on Sep. 30, 2003 and Japanese Patent Application No. 2004-208580 filed on Jul. 15, 2004, which are herein incorporated by reference.

What is claimed is:

1. A still image generation method of generating a relatively high-resolution second image from multiple relatively low-resolution first images, the still image generation method comprising the steps of:
   (a) estimating a correction rate for elimination of a positional shift between the multiple first images; and
   (b) executing correction with the estimated correction rate to eliminate the positional shift between the multiple first images and combining the multiple corrected first images to generate the second image,
   the step (b) comprising the steps of:
   (b1) selecting a target pixel among pixels included in the second image;
   (b2) detecting multiple adjacent pixels respectively in the multiple first images, which adjoin to the selected target pixel; and
   (b3) selecting a composition object image with regard to the target pixel among the multiple first images according to the multiple adjacent pixels, and calculating a pixel value of the target pixel based on the composition object image,
   wherein the step (b3) selects one base image from among the multiple first images when selecting the composition object image among the multiple first images, determines whether or not the multiple adjacent pixels in the multiple first images other than the base image have a motion relative to the base image, and if it determines that a certain adjacent pixel out of the multiple adjacent pixels has a motion, the step (b3) excludes the first images including the certain adjacent pixel from the composition object image with regard to the target pixel,
   wherein the step (b3) comprises the steps of:
   (b31) when the first image including a nearest pixel having a shortest distance to the target pixel among the multiple adjacent pixels is the base image, calculating the pixel value of the target pixel based on the base image, and (b32) sequentially selecting an adjacent pixel that is not included in the base image among the multiple adjacent pixels in an order closer to the target pixel and detecting motion or no motion of the selected pixel relative to the base image, the step (b31) calculating the pixel value of the target pixel based on the first image including the selected pixel detected as a pixel with no motion, while calculating the pixel value of the target pixel based on the base image when every selected adjacent pixel is detected as a pixel with motion, and wherein each of the steps of the still image generation method is executed by a processor.

2. A still image generation method in accordance with claim 1, wherein the step (b32) detects the selected pixel as the pixel with no motion when a luminance value of the selected pixel is within a predetermined range relative to an estimated luminance value, which is calculated from luminance values of multiple nearby pixels in the base image surrounding the selected pixel, while detecting the selected pixel as the pixel with motion when the luminance value of the selected pixel is out of the predetermined range.

3. A still image generation method in accordance with claim 2, wherein the predetermined range has a fixed span set about the estimated luminance value.

4. A still image generation method in accordance with claim 3, wherein the predetermined range varies corresponding to a time difference of the first image including the selected pixel relative to the base image.

5. A still image generation method in accordance with claim 2, wherein the predetermined range has a fixed span between a minimum luminance value and a maximum luminance value out of the luminance values of the multiple nearby pixels in the base image surrounding the selected pixel.

6. A still image generation method in accordance with claim 2, wherein the predetermined range varies depending upon a position of the selected pixel relative to the multiple nearby pixels in the base image surrounding the selected pixel.

7. A still image generation method in accordance with claim 1, wherein the step (b32) computes an estimated position of a pixel having a luminance value that is calculated from luminance values of multiple nearby pixels in the base image surrounding the selected pixel and is identical with a luminance value of the selected pixel, and detects the selected pixel as the pixel with no motion when a distance between a position of the selected pixel and the estimated position is within a predetermined range, while detecting the selected pixel as the pixel with motion when the distance between the position of the selected pixel and the estimated position is out of the predetermined range.

8. A still image generation method in accordance with claim 7, wherein the predetermined range has a fixed span about the estimated position with setting of a variation in estimated position, which varies corresponding to the positional shift, as a threshold value.

* * * * *